US012812179B2

(12) United States Patent
Zakharchenko et al.

(10) Patent No.: US 12,812,179 B2
(45) Date of Patent: Nov. 24, 2026

(54) DYNAMIC MESH GEOMETRY REFINEMENT COMPONENT ADAPTIVE CODING

(71) Applicant: GUANGDONG OPPO MOBILE TELECOMMUNICATIONS CORP., LTD., Dongguan (CN)

(72) Inventors: Vladyslav Zakharchenko, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 8 days.

(21) Appl. No.: 18/996,381

(22) PCT Filed: Aug. 9, 2023

(86) PCT No.: PCT/US2023/029812

§ 371 (c)(1),
(2) Date: Jan. 17, 2025

(87) PCT Pub. No.: WO2024/035762

PCT Pub. Date: Feb. 15, 2024

(65) Prior Publication Data

US 2026/0019639 A1 Jan. 15, 2026

Related U.S. Application Data

(60) Provisional application No. 63/370,919, filed on Aug. 9, 2022.

(51) Int. Cl.
*H04N 19/10* (2014.01)
*H04N 19/124* (2014.01)
(Continued)

(52) U.S. Cl.
CPC .......... *H04N 19/70* (2014.11); *H04N 19/124* (2014.11); *H04N 19/13* (2014.11); *H04N 19/184* (2014.11)

(58) Field of Classification Search
None
See application file for complete search history.

(56) References Cited

U.S. PATENT DOCUMENTS

2018/0098089 A1* 4/2018 Chen .................... H04N 19/521
2021/0090301 A1 3/2021 Mammou et al.
(Continued)

FOREIGN PATENT DOCUMENTS

EP 3691275 8/2020
WO 2021053262 3/2021

OTHER PUBLICATIONS

Pereira et al., "Point cloud coding: A privileged view driven by a classification taxonomy," Signal Processing: Image Communication, Jul. 2020, vol. 85.

(Continued)

*Primary Examiner* — Christopher Braniff
(74) *Attorney, Agent, or Firm* — Hodgson Russ LLP

(57) ABSTRACT

Computer-implemented methods and systems for processing geometry replacements are disclosed. The methods include decoding/encoding a syntax element associated with a coding mode from/into a bitstream associated with geometry displacements; and reconstructing/converting, based on a coefficient configuration associated with the coding mode, a plurality of quantized transform coefficients from/to a plurality of zero-run length codes.

13 Claims, 22 Drawing Sheets

(51) Int. Cl.

| | |
|---|---|
| ***H04N 19/13*** | (2014.01) |
| ***H04N 19/184*** | (2014.01) |
| ***H04N 19/70*** | (2014.01) |

(56) References Cited

U.S. PATENT DOCUMENTS

| | | | | |
|---|---|---|---|---|
| 2021/0104090 | A1 | 4/2021 | Hur et al. | |
| 2021/0211673 | A1 | 7/2021 | Schwarz et al. | |
| 2021/0250576 | A1 | 8/2021 | Kim | |
| 2021/0314616 | A1 | 10/2021 | Ray et al. | |
| 2022/0038746 | A1 | 2/2022 | Kato et al. | |
| 2023/0412849 | A1 * | 12/2023 | Huang | H04N 19/91 |

OTHER PUBLICATIONS

WIPO, International Search Report and Written Opinion for International Application No. PCT/US2023/029812, Dec. 1, 2023.

Rossignac, "Edgebreaker: Connectivity compression for triangle meshes," IEEE Transactions on Visualization and Computer Graphics, 1999, vol. 5, No. 1.

Sullivan et al., "Overview of the High Efficiency Video Coding (HEVC) Standard," IEEE Transactions on Circuits and Systems for Video Technology, Dec. 2012, vol. 22, No. 12.

Faramarzi et al., "Mesh Coding Extensions to MPEG-I V-PCC," 2020 IEEE 22nd International Workshop on Multimedia Signal Processing (MMSP), 2020.

* cited by examiner

800

810

```
# --------------------------------
# Part 1 :
#  geometry information
#  X  Y   Z
# vertex 0 (v_idx_0)
v  0.0 0.0 0.0
# vertex 1 (v_idx_1)
v  1.0 0.0 0.0
# vertex 2 (v_idx_2)
v  0.0 1.0 0.0
# vertex 3 (v_idx_3)
v  0.0 0.0 1.0
# --------------------------------
# Part 2 :
#  mapping information
#  U   V
#  texture vertex 0 (vt_0)
vt 0.500000 0.500000
#  texture vertex 1 (vt_1)
vt 0.000000 0.500000
#  texture vertex 2 (vt_2)
vt 0.500000 1.000000
#  texture vertex 3 (vt_3)
vt 1.000000 0.500000
#  texture vertex 4 (vt_4)
vt 0.500000 0.000000
# --------------------------------
# Part 3 :
#  connectivity information
#  v_idx / vt_idx
# face 0 (f_idx_0)
f   0/0 1/2 2/1
# face 1 (f_idx_1)
f   0/0 3/2 1/3
# face 2 (f_idx_2)
f   0/0 2/3 3/4
```

830

820

1500

1510

| dmesh_sequence_parameter_set_rbsp( ) { | **Descriptor** |
|---|---|
| **dmsps_sequence_parameter_set_id** | u(4) |
| dmesh_profile_tier_level( ) | |
| ... | |
| ***dmsps_mesh_LoD_count_minus_1*** | *u(3)* |
| *for( i = 0; i < dmsps_mesh_LoD_coun_minus_1 + 1; i++ ) {* | |
| ***dmsps_mesh_LoD_coding_mode**[ i ]* | u(3) |
| } | |
| ... | |
| rbsp_trailing_bits( ) | |
| } | |

FIG. 15

1600

| i | dmsps_mesh_LoD_coding_mode[ i ] |
|---|---|
| 0 | Skip |
| 1 | Simple |
| 2 | Full |
| 3-7 | Reserved |

FIG. 16

1700

1710

| dmesh_picture_parameter_set_rbsp( ) { | **Descriptor** |
|---|---|
| **dmpps_picture_parameter_set_id** | u(4) |
| ... | |
| ***dmpps_mesh_LoD_count_override_flag*** | *u(1)* |
| *if (dmpps_mesh_LoD_count_override == 1) {* | |
| ***dmpps_mesh_LoD_count_minus_1*** | *u(3)* |
| *for( i = 0; i < dmsps_mesh_LoD_count_minus_1 + 1; i++ ) {* | |
| *dmpps_mesh_LoD_ coding_mode [ i ]* | *u(3)* |
| *}* | |
| *}* | |
| ... | |
| rbsp_trailing_bits( ) | |
| } | |

FIG. 17

1800

| i | dmpps_mesh_LoD_coding_mode[ i ] |
|---|---|
| 0 | Skip |
| 1 | Simple |
| 2 | Full |
| 3-7 | Reserved |

FIG. 18

2200

| *x* | ***k*=0** | ***k*=1** | ***k*=2** | ***k*=3** | *x* | ***k*=0** | ***k*=1** | ***k*=2** | ***k*=3** | *x* | ***k*=0** | ***k*=1** | ***k*=2** | ***k*=3** |
|---|---|---|---|---|---|---|---|---|---|---|---|---|---|---|
| 0 | 1 | 10 | 100 | 1000 | 10 | 0001011 | 001100 | 01110 | 010010 | 20 | 000010101 | 00010110 | 0011000 | 011100 |
| 1 | 010 | 11 | 101 | 1001 | 11 | 0001100 | 001101 | 01111 | 010011 | 21 | 000010110 | 00010111 | 0011001 | 011101 |
| 2 | 011 | 0100 | 110 | 1010 | 12 | 0001101 | 001110 | 0010000 | 010100 | 22 | 000010111 | 00011000 | 0011010 | 011110 |
| 3 | 00100 | 0101 | 111 | 1011 | 13 | 0001110 | 001111 | 0010001 | 010101 | 23 | 000011000 | 00011001 | 0011011 | 011111 |
| 4 | 00101 | 0110 | 01000 | 1100 | 14 | 0001111 | 00010000 | 0010010 | 010110 | 24 | 000011001 | 00011010 | 0011100 | 00100000 |
| 5 | 00110 | 0111 | 01001 | 1101 | 15 | 000010000 | 00010001 | 0010011 | 010111 | 25 | 000011010 | 00011011 | 0011101 | 00100001 |
| 6 | 00111 | 001000 | 01010 | 1110 | 16 | 000010001 | 00010010 | 0010100 | 011000 | 26 | 000011011 | 00011100 | 0011110 | 00100010 |
| 7 | 0001000 | 001001 | 01011 | 1111 | 17 | 000010010 | 00010011 | 0010101 | 011001 | 27 | 000011100 | 00011101 | 0011111 | 00100011 |
| 8 | 0001001 | 001010 | 01100 | 010000 | 18 | 000010011 | 00010100 | 0010110 | 011010 | 28 | 000011101 | 00011110 | 000100000 | 00100100 |
| 9 | 0001010 | 001011 | 01101 | 010001 | 19 | 000010100 | 00010101 | 0010111 | 011011 | 29 | 000011110 | 00011111 | 000100001 | 00100101 |

FIG. 22

DYNAMIC MESH GEOMETRY REFINEMENT COMPONENT ADAPTIVE CODING

CROSS-REFERENCE TO RELATED APPLICATIONS

This application is a U.S. National Stage entry of International Application No. PCT/US2023/029812, filed on Aug. 9, 2023, which claims priority to U.S. Provisional Application No. 63/370,919, filed on Aug. 9, 2022, the entire disclosures of which are hereby incorporated by reference.

BACKGROUND OF DISCLOSURE

Field of the Disclosure

The present disclosure relates generally to computer-implemented methods and systems for dynamic mesh processing, and more particularly, to dynamic mesh geometry refinement component adaptive coding.

Description of the Related Art

In three-dimensional (3D) computer graphics and solid modeling, a polygon mesh is a collection of vertices, edges, and faces that defines the shape of a polyhedral object. For example, a coding method for geometry information is applied, in which a base mesh is subdivided, and displacement components are packed into a two-dimensional (2D) image/video format. However, a process of mapping 3D displacement coefficients to a 2D surface and further video coding imposes a coding delay and requires additional memory storage. Thus, there is a need for geometry information improvement.

SUMMARY

In a first aspect of the present disclosure, a decoding method, including: decoding a syntax element associated with a coding mode from a bitstream associated with geometry displacements; and reconstructing, based on a coefficient configuration associated with the coding mode, a plurality of quantized transform coefficients from a plurality of zero-run length codes.

In a second aspect of the present disclosure, a decoder includes: a processor; and a memory coupled to the processor, wherein the processor is configured to execute program instructions stored in the memory to perform the computer-implemented method regarding the first aspect of the present disclosure.

In a third aspect of the present disclosure, an encoding method, including: encoding a syntax element associated with a coding mode into a bitstream associated with geometry displacements; and converting, based on a coefficient configuration associated with the coding mode, a plurality of quantized transform coefficients to a plurality of zero-run length codes.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

FIG. 15 shows a table illustrating a syntax structure associated with a function dmesh_sequence_parameter_set_rbsp( ) according to an embodiment of the present disclosure.

FIG. 16 shows a table indicating various coding modes assigned by a syntax element "dmsps_mesh_LoD_coding_mode[i] according to an embodiment of the present disclosure.

FIG. 17 shows a table illustrating a syntax structure associated with a function dmesh_picture_parameter_set_rbsp( ) according to an embodiment of the present disclosure.

FIG. 18 shows a table indicating various coding modes assigned by a syntax element "dmpps_mesh_LoD_coding_mode[i] according to an embodiment of the present disclosure.

FIG. 22 shows a table illustrating k-th Exp-Golomb coding examples that can be applied to embodiments of the present disclosure.

DETAILED DESCRIPTION OF EMBODIMENTS

Figure 1:
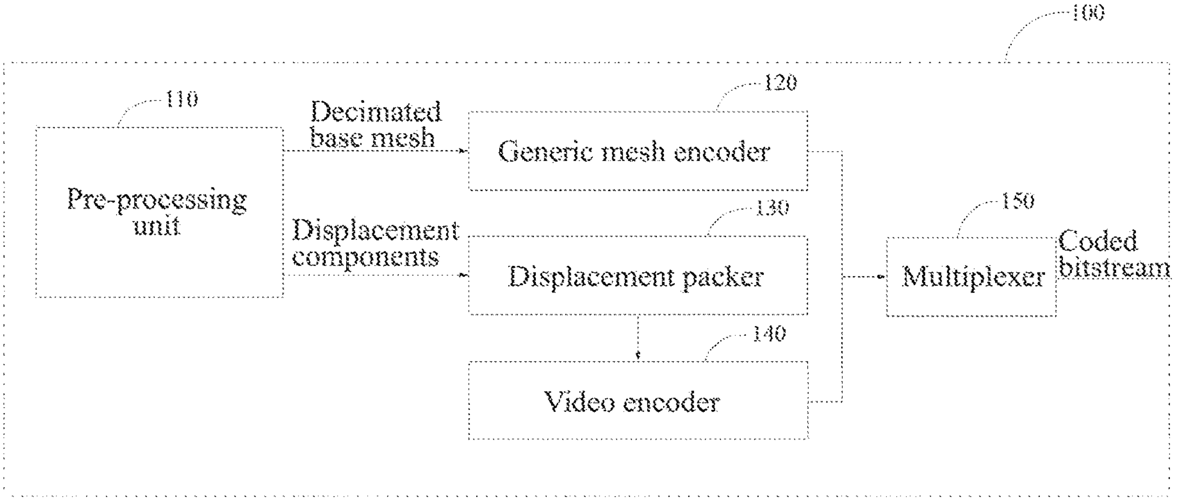
FIG. 1 shows a schematic diagram illustrating a geometry encoder that can be applied to embodiments of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Currently, three-dimensional (3D) computer graphics and solid modeling are applied in many application scenarios, such as augmented reality (AR).

For illustrative purposes, terms are provided below. Term, "mesh," refers to a collection of vertices, edges, and faces that defines the shape/topology of a polyhedral object, wherein the faces usually consist of triangles (triangle mesh). Term, "base mesh," refers to a mesh with fewer vertexes but preserves similarity to the original surface. Term, "dynamic mesh," refers to a mesh with at least one of the five components, such as connectivity, geometry, mapping, vertex attribute, and attribute map, varying in time. Term, "animated mesh," refers to a dynamic mesh with constant connectivity. Parametrized mesh refers to a mesh with the topology defined as the mapping component. Term, "connectivity," refers to a set of vertex indices describing how to connect the mesh vertices to create a 3D surface, e.g., geometry and all the attributes share the same unique connectivity information. Term, "geometry," refers to a set of vertex of 3D (x, y, z) coordinates describing positions associated with the mesh vertices, wherein the (x, y, z) coordinates representing the positions should have finite precision and dynamic range. Term, "mapping," refers to a description of how to map the mesh surface to 2D regions of the plane, e.g., such mapping is described by a set of UV parametric/texture mapping coordinates associated with the mesh vertices together with the connectivity information. Term, "vertex attribute," refers to a scalar of vector attribute values associated with the mesh vertices. Term, "attribute map," refers to attributes associated with the mesh surface and stored as 2D images/videos, wherein the mapping between the videos (i.e., parametric space) and the surface is defined by the mapping information. Term, "vertex," refers to a position (usually in 3D space) along with other information such as color, normal vector, and texture coordinates. Term, "edge," refers to a connection between two vertices. Term, "face," refers to a closed set of edges in which a triangle face has three edges defined by three vertices, wherein orientation of the face is determined using a "right-hand" coordinate system. Term, "surface," refers to a collection of faces that separates the three-dimensional object from the environment. Term "bpp" refers to bits per point, an amount of information in terms of bits required to describe one point in the mesh. Term, "displacements," refer to the difference between the original mesh geometry and the mesh geometry reconstructed due to the base mesh subdivision process. Term, "LoD (Level of details)," refers to scalable representation of mesh reconstruction, each level of detail contains enough information to reconstruct mesh to an indicated precision or spatial resolution, wherein each following level of detail is a refinement on top of the plurality of previously reconstructed mesh.

For example, in three-dimensional (3D) computer graphics and solid modeling, a polygon mesh is a collection of vertices, edges, and faces that defines the shape of a polyhedral object. For example, current algorithms apply two-stage encoding to encode geometry information. A high-level diagram of the two-stage geometry coding process is described in FIG. 1.

For example, FIG. 1 shows a schematic diagram illustrating a geometry encoder 100, which includes a pre-processing unit 110, a generic mesh encoder 120, a displacement packer 130, a video encoder 140, and a multiplexer 150. The pre-processing unit 110 is capable of base geometry and displacements generation to provide a decimated based mesh and displacement components. The generic mesh encoder 120 is capable of processing the decimated based mesh in generic mesh encoding to generate mesh-coded data. The displacement packer 130 is capable of packing the displacement components into a two-dimensional (2D) image. The video encoder 140 is capable of processing the two-dimensional image in video coding for displacements to generate video-coded data. The multiplexer 150 is capable of multiplexing the mesh-coded data and video-coded data into a coded bitstream.

For example, as shown in FIG. 1, first, geometry data is decimated to create a base mesh encoded using generic geometry coding methods, i.e., "edgebreaker."; then, the base mesh is hierarchically subdivided, and the difference between the subdivided point and the approximation of the original mesh is stored as the geometry displacement components. The displacement components are packed into the two-dimensional image and encoded with lossless video coding methods such as high efficiency video coding (HEVC).

Figure 2:
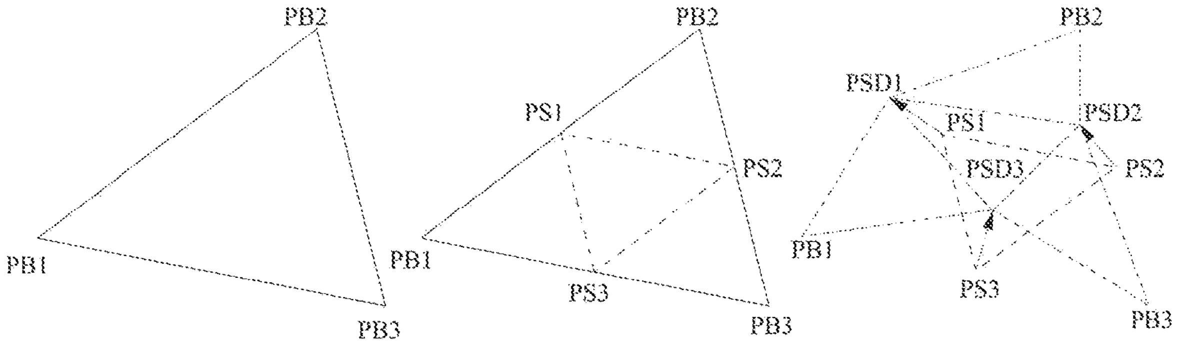
FIG. 2 shows a schematic diagram illustrating displacements subdivision and approximation process that can be applied to embodiments of the present disclosure.

For example, as shown in FIG. 2, which shows a schematic diagram illustrating displacements subdivision and approximation process. In FIG. 2, a displacement generation process for one face in a base mesh with one refinement step is illustrated, e.g., PB1, PB2, and PB3 denote the base mesh points; PS1, PS2, and PS3 represent subdivided points; and PSD1, PSD2, and PSD3 represent subdivided displaced points. For example, the subdivided point PS1 is calculated as a mid-point between the base mesh points PB1 and PB2. The calculating process can be recursively repeated. In an example, as shown in FIG. 2, three replacement vectors, i.e., a vector from PS1 to PSD1, a vector from PS2 to PSD2, and a vector from PS3 to PSD3 are pointing in different directions.

Figure 3:
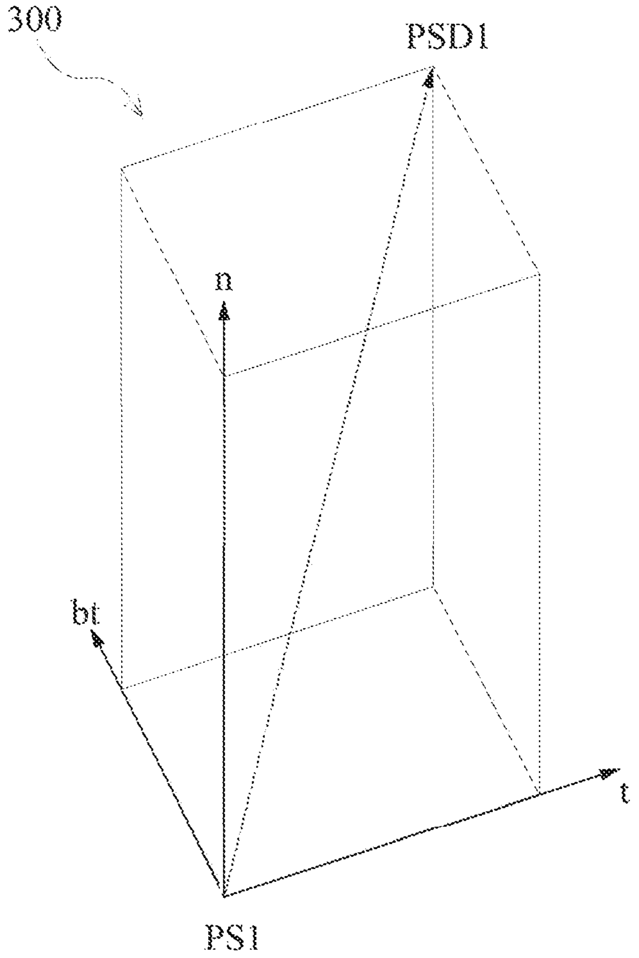
FIG. 3 shows a schematic diagram illustrating displacement component decomposition in a coordinate system that can be applied to embodiments of the present disclosure.

For example, as shown in FIG. 3, which shows a schematic diagram illustrating displacement component decomposition in a coordinate system 300, In FIG. 3, each vector from a point (such as a base mesh point PS1) to a point (such as a subdivided displaced point PSD1) is described as three components in normal (n), tangent (t), and bitangent (bt) directions that are further processed with wavelet transform, and corresponding transform coefficients are mapped to color planes (e.g., Y, U, and V components in YUV 444 color space).

It should be note that a process of mapping 3D displacement coefficients to a 2D surface and further video coding imposes a coding delay and requires additional memory storage.

Figure 4:
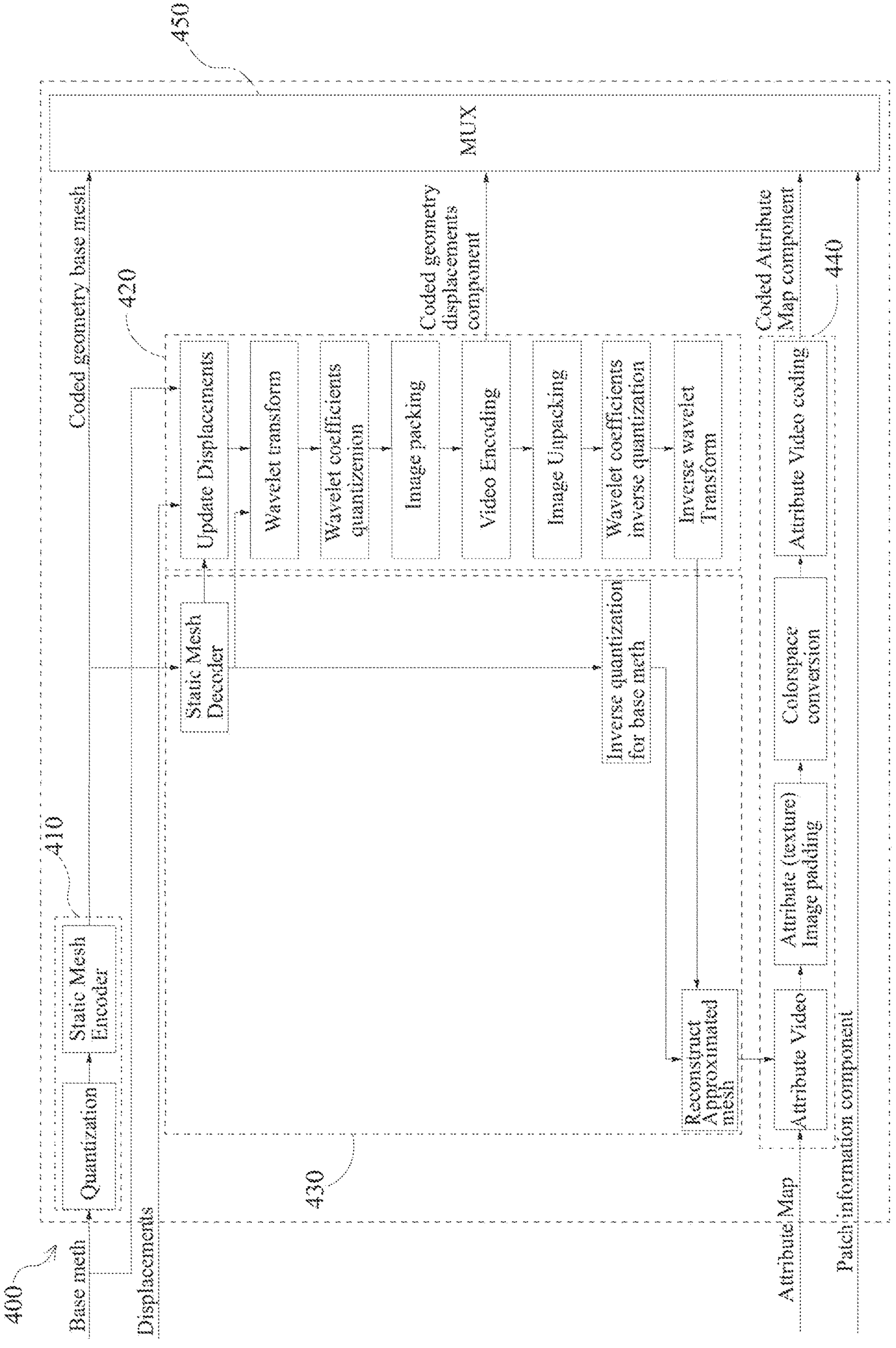
FIG. 4 shows a schematic diagram illustrating a parametrized mesh coding process in a parametrized mesh coder that can be applied to embodiments of the present disclosure.

For example, as shown in FIG. 4, which shows a schematic diagram illustrating a parametrized mesh coding process in a parametrized mesh coder 400. The parametrized mesh coder 400 includes a mesh coding part 410, a displacements coding part 420, a mesh reconstruction part 430, an attribute map processing part 440, and a multiplexer 450. The mesh coding part 410 is capable of processing data regarding a base mesh in quantization and static mesh encoding to generate coded geometry base mesh data. The displacements coding part 420 is capable of processing data regarding displacements in updating, transform, quantization, packing, video encoding, image unpacking, inverse quantization, and inverse transform, wherein coded geometry displacements component data is generated in video encoding. The mesh reconstruction part 430 is capable of processing data processed by the mesh coding part 410 in static mesh decoding, inverse quantization, and approximated mesh reconstruction. The attribute map processing part 440 is capable of processing data regarding attribute map in video attribution, attribute (texture) image padding, color space conversion, and attribute video coding to generate coded attribute map component data. The multiplexer 450 is capable of multiplexing data output from the mesh coding part 410, the displacements coding part 420, and the attribute map processing part 440 to generate a coded bitstream.

For example, as shown in FIG. 4, a base mesh frame is quantized and encoded using a static mesh encoder. The process is agnostic of which mesh encoding scheme is used to compress the base mesh. The displacements are processed by a hierarchical wavelet (or another) transform that recursively applies refinement layers to the reconstructed base mesh. In one aspect, the wavelet coefficients are then quantized, packed into a 2D image/video, and can be compressed by using an image/video encoder such as HEVC. In another aspect, the reconstructed wavelet coefficients are obtained by applying image unpacking and inverse quantization to the reconstructed wavelet coefficients of an image/video generated during an image/video decoding process. Further, reconstructed displacements are then computed by applying the inverse wavelet transform to the reconstructed wavelet coefficients.

For example, wavelet coefficients are calculated in floating-point format and can be positive and negative. In the current art to compose a 2D image, the coefficients are first converted to positive and mapped to a given bit-depth, illustrated as below:

$$c'(i) = 2^\wedge\left[\text{bit\_depth}-1\right] + [c(i) * 2^\wedge\text{bit\_depth}]/[c\_\max - c\_\min],$$

wherein c'(i) is integerized displacement coefficient value, c(i) is a current displacement coefficient, c_max is a maximum displacement coefficient value, c_min is a minimum displacement coefficient value, and bit-depth is a value that defines a number of fixed levels for image coding.

Figure 5:
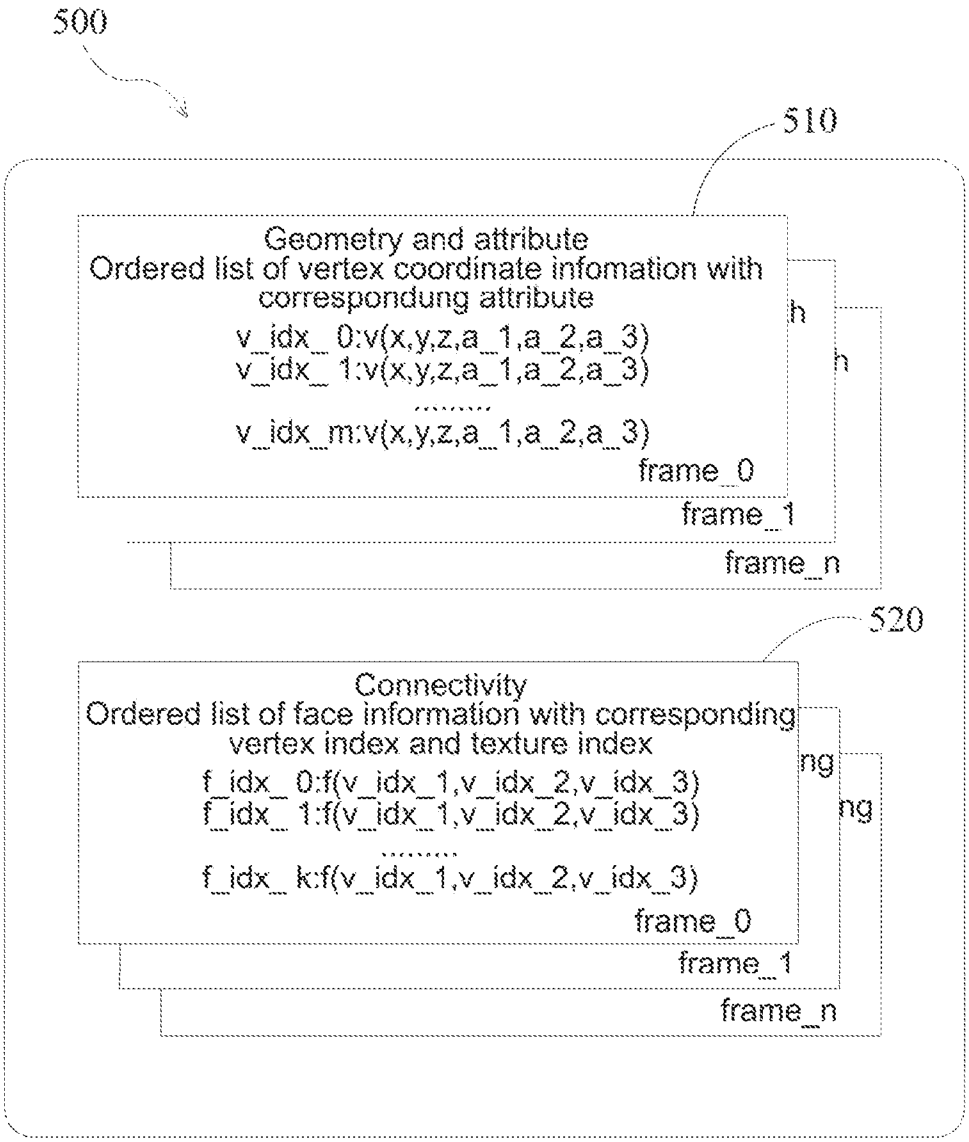
FIG. 5 shows a schematic diagram illustrating an example of geometry information in one mesh frame that can be applied to embodiments of the present disclosure.

In addition, FIG. 5 shows a schematic diagram illustrating an example of geometry information in one mesh frame. In FIG. 5, mesh frame 500 associated with color-per-vertex approaches are provided, wherein geometry and attribute information 510 can be stored in mesh frames as an ordered list of vertex coordinate information stored with corresponding geometry and attribute information, and connectivity information 520 can be stored in mesh frames as an ordered list of face information including corresponding vertex indices and texture indices. For example, as shown in FIG. 5, a surface, represented by a mesh with color per vertex characteristics that consists of four vertices and three faces, is demonstrated. A position in space describes each vertex by X, Y, Z coordinates and color attributes R, G, B.

Figure 6:
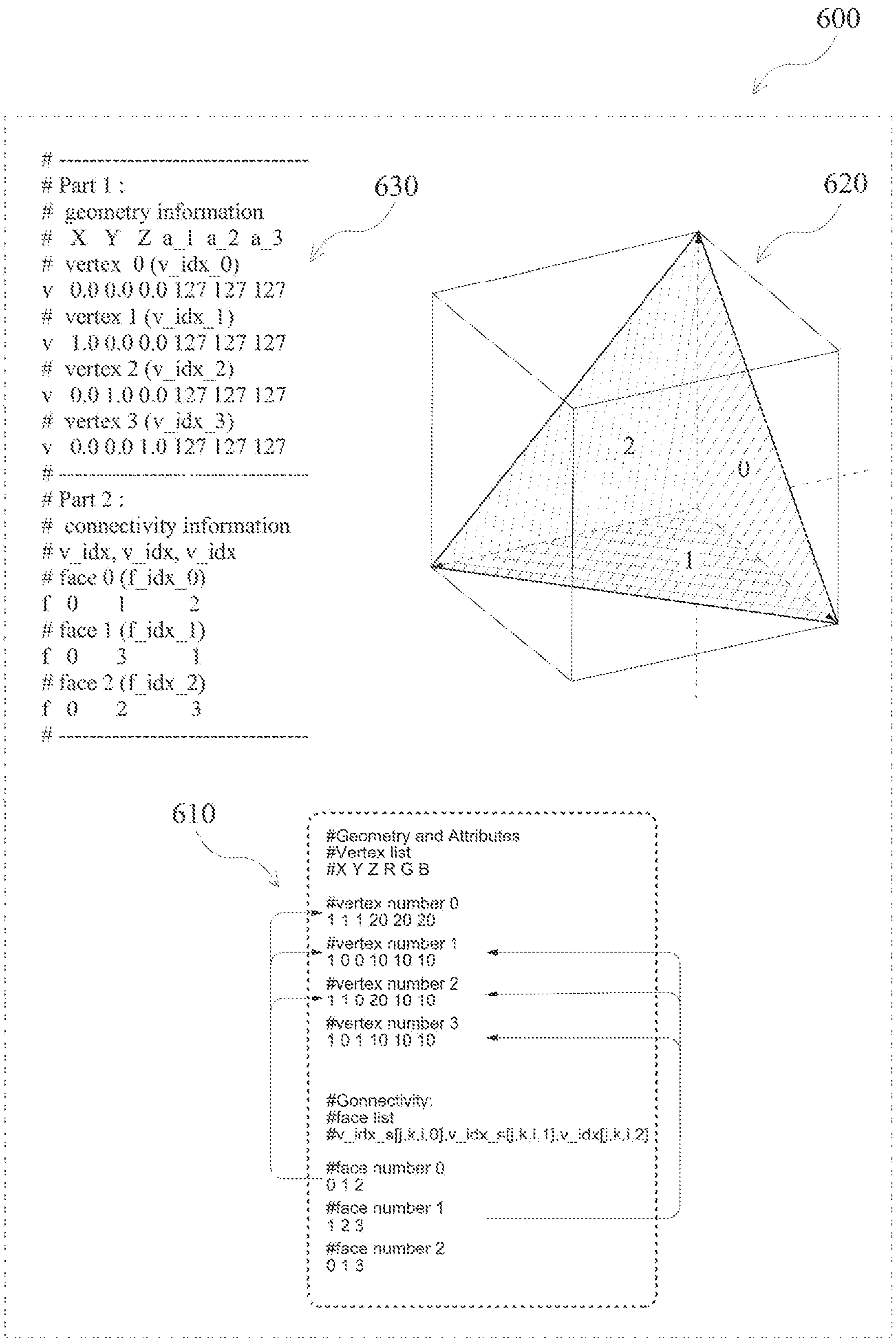
FIG. 6 shows a schematic diagram illustrating an example of a mesh comprised of four vertices (geometry) and three triangular faces (connectivity) that can be applied to embodiments of the present disclosure.

In addition, FIG. 6 shows a schematic diagram illustrating an example 600 of a mesh including four vertices (geometry) and three triangular faces (connectivity). In FIG. 6, a mesh frame 610, a corresponding three-dimensional (3D) content 620, and an underlying defining data 630 associated with color-per-vertex approaches are illustrated. As illustrated in the mesh frame 610 and the corresponding data 630, geometry coordinates with associated attribute information and connectivity information are stored in a mesh frame, wherein geometry and attribute information are stored as an ordered list of vertex geometry coordinate information with associated attribute information, and connectivity information is stored as an ordered list of face information with corresponding vertex indices. The geometry and attribute information illustrated in the mesh frame 610 includes four vertices. The positions of the vertices are indicated by X, Y, Z coordinates and color attributes are indicated by a_1, a_2, a_3 values that represent the R, G, B color prime values. The connectivity information illustrated in the mesh frame 610 includes three faces. As shown in FIG. 6, each face is defined by three vertex indices that form a triangle. Each face includes three vertex indices listed in the geometry and attribute information to form a triangle face. The 3D content 620 (e.g., a 3D triangle) can be decoded based on the mesh frames 610 by using the vertex indices for each corresponding face to point to the geometry and attribute information stored for each vertex coordinate.

Figure 7:
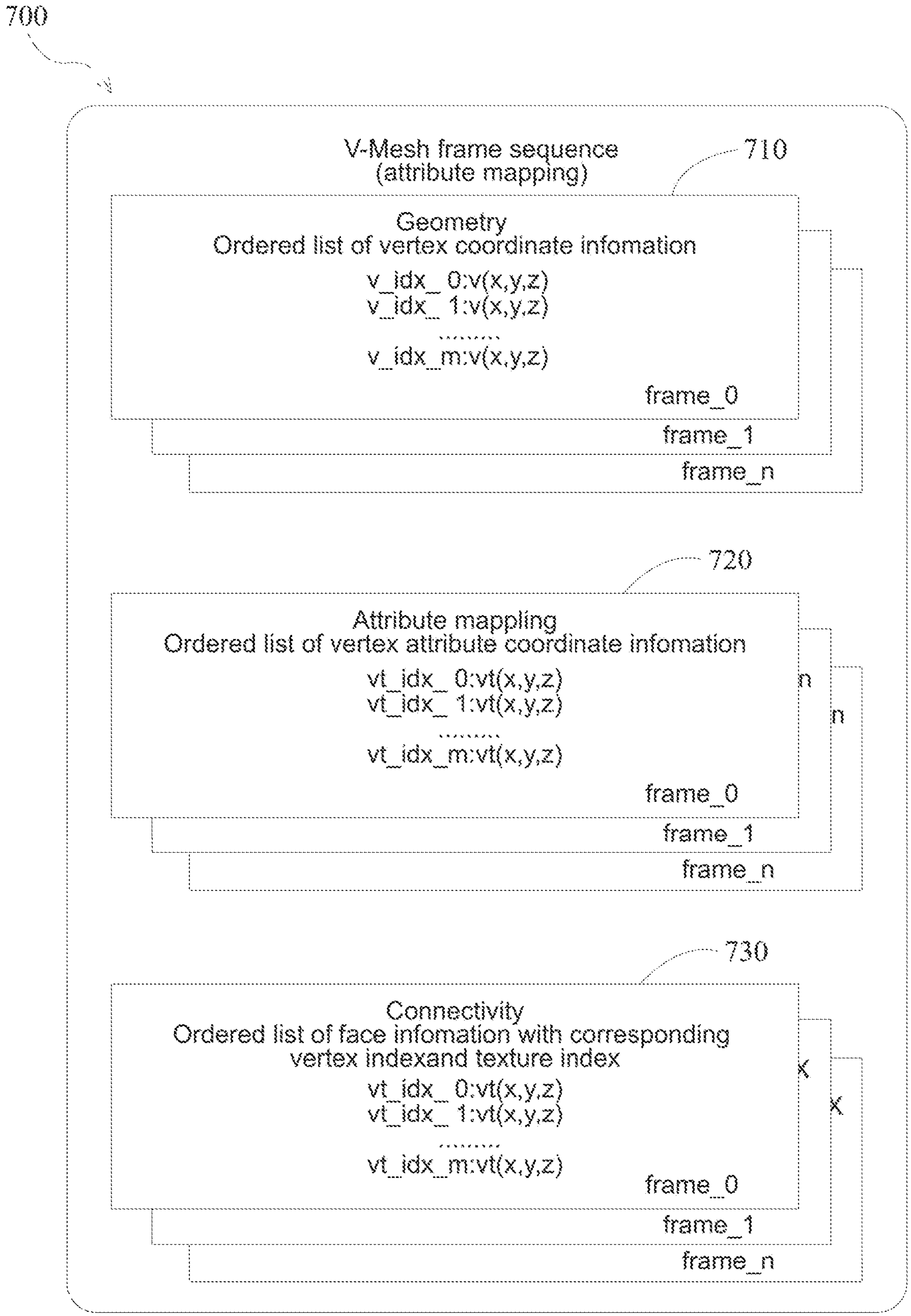
FIG. 7 shows a schematic diagram illustrating an example of data structure for a parametrized mesh that can be applied to embodiments of the present disclosure.

In addition, FIG. 7 shows a schematic diagram illustrating an example of data structure for a parametrized mesh. In FIG. 7, uncompressed mesh frames 700 are associated with 3D coding approaches using texture maps; geometry information 710 can be stored in mesh frames as an ordered list of vertex coordinate information, wherein each vertex coordinate is stored with corresponding geometry information; attribute information 720 can be stored in mesh frames, separated from the geometry information 710, as an ordered list of projected vertex attribute coordinate information, wherein the projected vertex attribute coordinate information is stored as 2D coordinate information with corresponding attribute information; connectivity information 730 can be stored in mesh frames as an ordered list of face information, with each face including corresponding vertex indices and texture indices.

Figure 8:
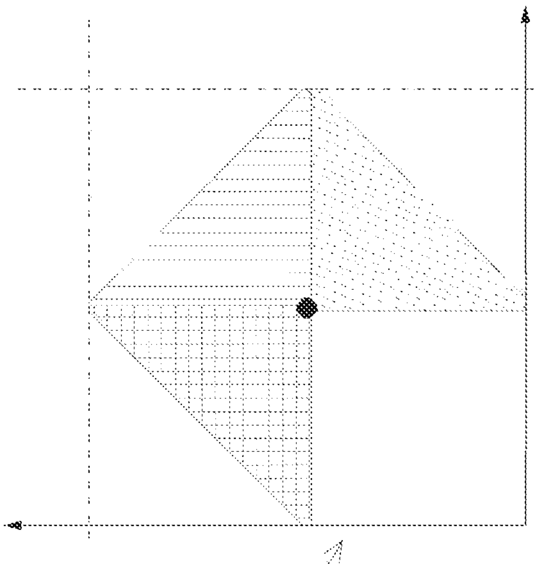
FIG. 8 shows a schematic diagram illustrating an example of a mesh comprised of four vertices and three triangular faces with a corresponding attribute UV map that can be applied to embodiments of the present disclosure.
Figure 8:
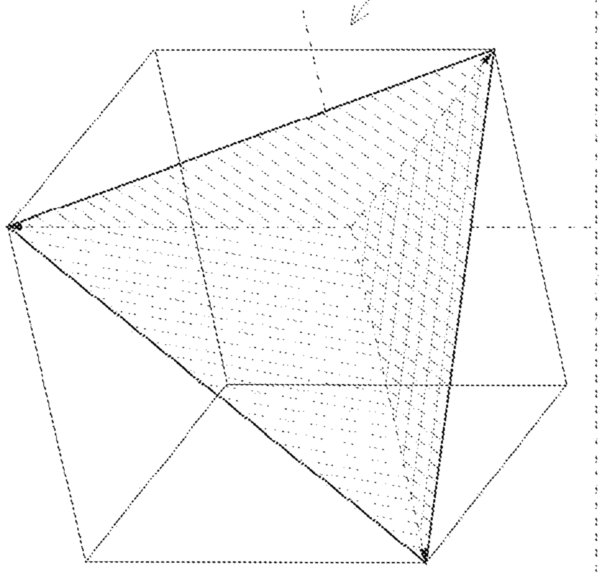

For example, FIG. 7 illustrates an example of a surface, represented by a mesh with attribute mapping characteristics that consists of four vertices and three faces, is demonstrated in FIG. 8. A position in space describes each vertex by X, Y, Z coordinates. (U, V) denotes attribute coordinates in a 2D texture vertex map. Each face is defined by three pairs of vertex indices and texture vertex coordinates that form a triangle in a 3D space and a triangle in the 2D texture map.

In addition, FIG. 8 shows a schematic diagram illustrating an example 800 of a mesh including four vertices and three triangular faces with a corresponding attribute UV map. In FIG. 8, data 810 defining a mesh frame, a corresponding 3D content 820, and a corresponding attribute map 830 associated with 3D coding approaches using attribute mapping are illustrated. As illustrated in FIG. 8, geometry information, mapping information (e.g., attribute information), and connectivity information are stored in the mesh frame generated based on information described in data 810. The geometry information contained in the mesh frame includes four vertices. The positions of the vertices are indicated by X, Y, Z coordinates. The mapping information in the mesh frame includes five texture vertices. The positions of the texture vertices are indicated by U, V coordinates. The connectivity information in the mesh frame includes three faces. Each face includes three pairs of vertex indices and texture vertex coordinates. As illustrated in FIG. 8, the 3D content 820 (e.g., the object formed by the triangles in the 3D space) and the attribute map 830 can be decoded based on the mesh frame by using the pairs of vertex indices and texture vertex coordinates for each face. Attribute information associated with the attribute map 830 can be applied to the 3D content 820 to apply the attribute information to the 3D content 820.

Figure 9A:
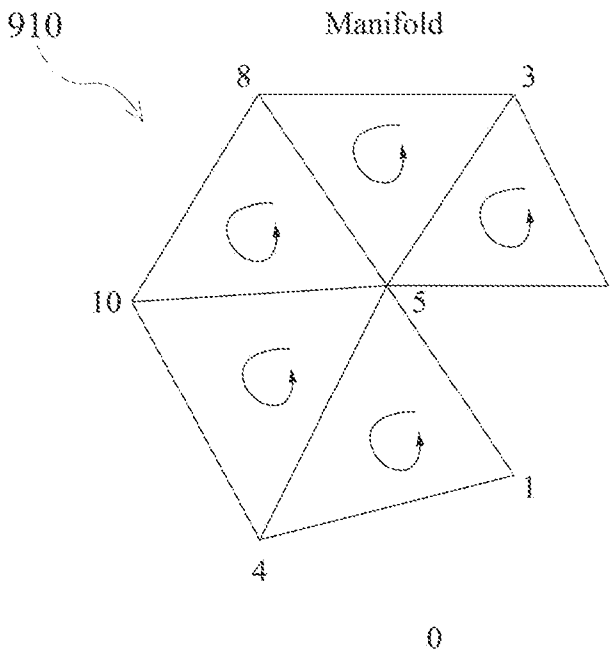
FIG. 9A shows a schematic diagram illustrating an example of face orientation for mesh based on a vertex index order that can be applied to embodiments of the present disclosure.
Figure 9B:
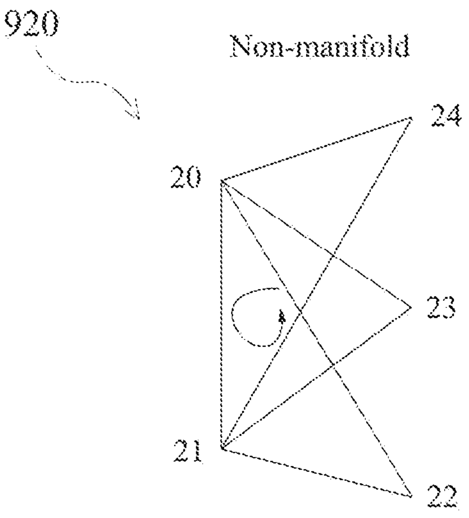
FIG. 9B shows a schematic diagram illustrating an example of face orientation for mesh based on a vertex index order that can be applied to embodiments of the present disclosure.

In addition, FIG. 9A and FIG. 9B show schematic diagrams illustrating examples of face orientation for mesh based on a vertex index order. For example, as shown in FIG. 9A and FIG. 9B, an orientation of the face can be determined using the right-hand coordinate system, wherein the face consists of three vertices that belong to three edges, and the three vertex indices describe each face. Face orientation for mesh based on vertex index order is provided. As illustrated in FIG. 9A and FIG. 9B, manifold mesh 910 is a mesh where one edge belongs to two different faces at most, and non-manifold mesh 920 is a mesh with an edge that belongs to more than two faces.

In the present disclosure, proposals are provided to improve coding efficiency for dynamic mesh geometry refinement information in an example such as a process of mapping 3D displacement coefficients to a 2D surface and further video coding that imposes the coding delay and requires additional memory storage.

Figure 10A:
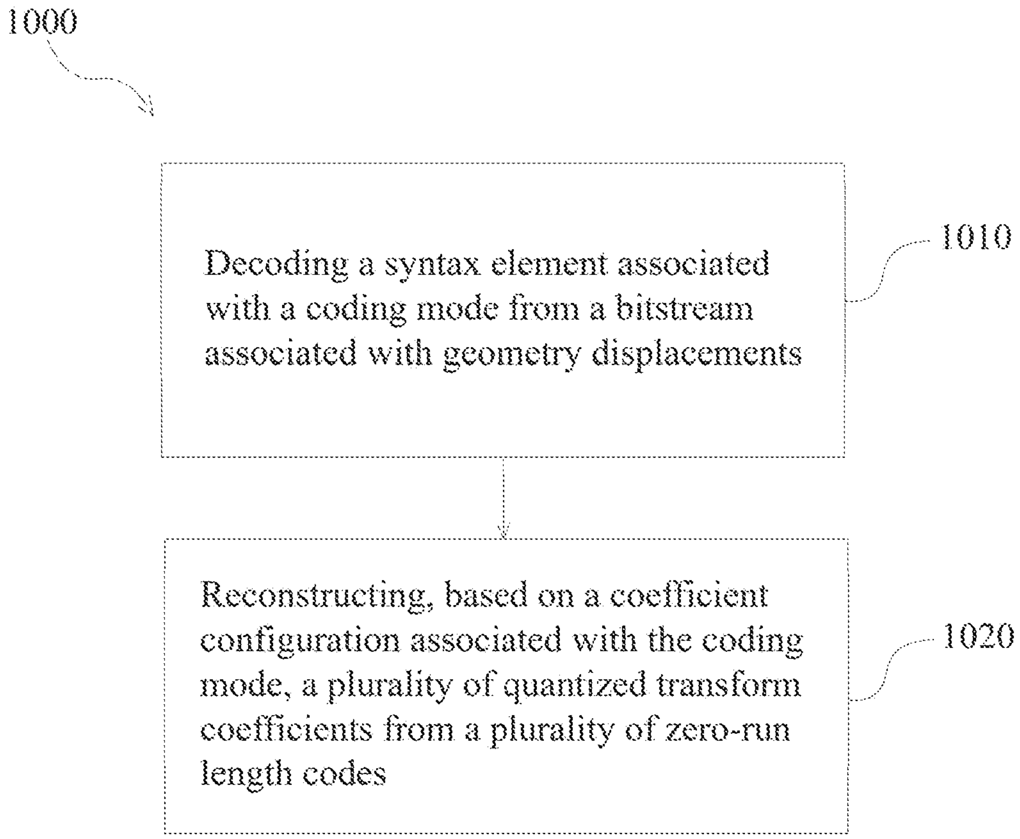
FIG. 10A shows a flowchart illustrating a decoding example of zero-run length coding according to an embodiment of the present disclosure.

For example, FIG. 10A shows a flowchart illustrating a decoding example of zero-run length coding combined with the coding mode for coefficients to decode displacement components instead of using image/video decoding. As shown in FIG. 10A, a computer-implemented method 1000 is provided and includes: a box 1010, decoding a syntax element associated with a coding mode from a bitstream associated with geometry displacements, e.g., the coding mode can be configured to indicate the coefficient configuration representing how many components of normal (n), tangent (t), and bitangent (bt) components of displacements in levels of details (LoD) are used and processed with a transform such as a wavelet transform; and a box 1020, reconstructing, based on a coefficient configuration associated with the coding mode, a plurality of quantized transform coefficients from a plurality of zero-run length codes.

In the present disclosure, zero-run length coding combined with entropy coding, transform, and quantization for coefficients to decode the displacement components can also be used to improve coding efficiency for dynamic mesh geometry refinement information.

Figure 10B:
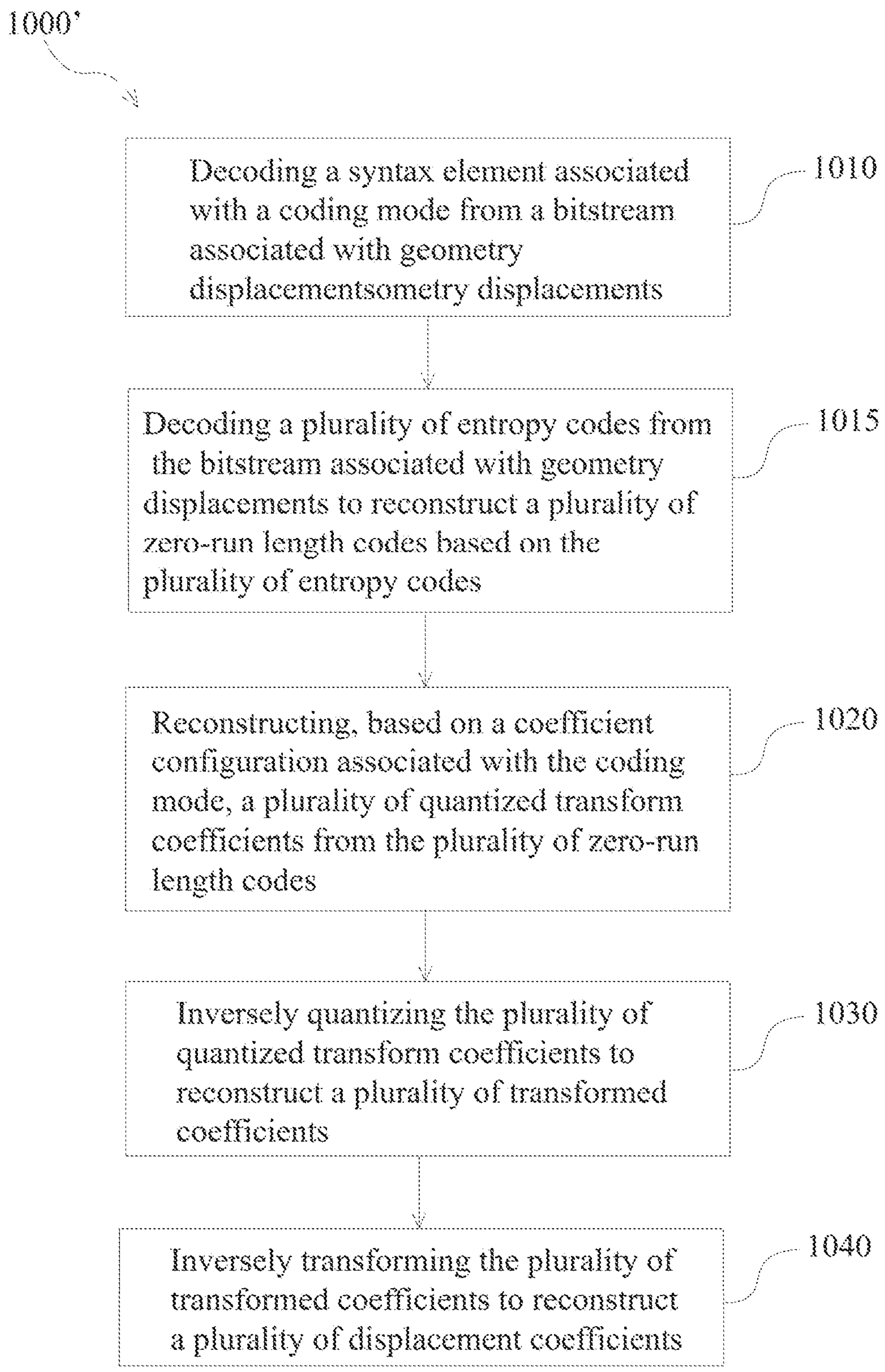
FIG. 10B shows a flowchart illustrating a decoding example of zero-run length coding combined with entropy coding, transform, and quantization according to an embodiment of the present disclosure.

For example, FIG. 10B shows a flowchart illustrating examples of zero-run length coding combined with entropy coding, transform, and quantization for coefficients to decode displacement components instead of using image/video decoding. As shown in FIG. 10B, a computer-implemented method 1000' is provided and includes boxes 1015, 1030, and 1040, in addition to boxes 1010 and 1020 shown in FIG. 10B that are also illustrated in boxes 1010 and 1020 shown in FIG. 10A described as above.

In some embodiments, as shown in FIG. 10B, the computer-implemented method 1000' further includes: box 1015, decoding a plurality of entropy codes from the bitstream associated with geometry displacements to reconstruct the plurality of zero-run length codes based on the plurality of entropy codes, such as a k-th order exp-Golomb code.

In some embodiments, as shown in FIG. 10B, the computer-implemented method 1000' further includes: box 1030, inversely quantizing the plurality of quantized transform coefficients to reconstruct a plurality of transformed coefficients.

In some embodiments, as shown in FIG. 10B, the computer-implemented method 1000' further includes: box 1040, inversely transforming (such as an inverse wavelet transform) the plurality of transformed coefficients to reconstruct a plurality of displacement coefficients.

Figure 11A:
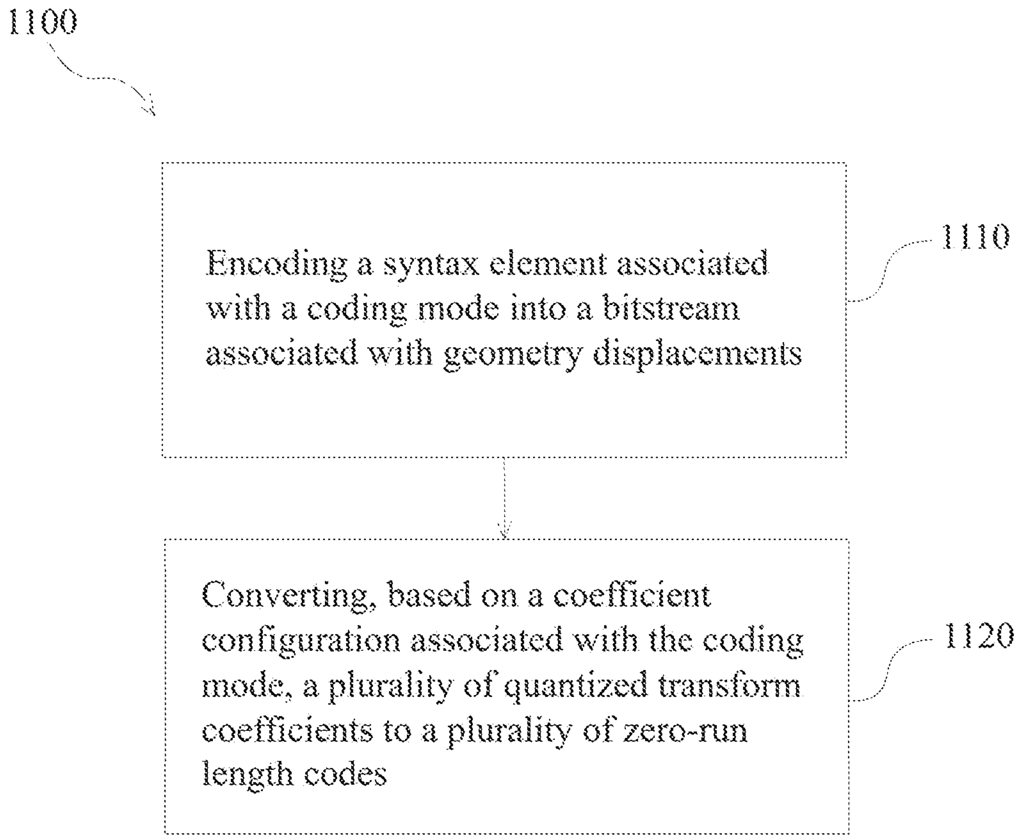
FIG. 11A shows a flowchart illustrating an encoding example of zero-run length coding according to an embodiment of the present disclosure.

Correspondingly, FIG. 11A shows a flowchart illustrating an encoding example of zero-run length coding combined with a coding mode for coefficients to encode displacement components instead of using image/video encoding. As shown in FIG. 11A, a computer-implemented method 1100 is provided and includes: a box 1110, encoding a syntax element associated with a coding mode into a bitstream associated with geometry displacements; and a box 1120, converting, based on a coefficient configuration associated with the coding mode, a plurality of quantized transform coefficients to a plurality of zero-run length codes.

In the present disclosure, zero-run length coding combined with entropy coding, transform, and quantization for coefficients to encode the displacement components can also be used to improve coding efficiency for dynamic mesh geometry refinement information.

Figure 11B:
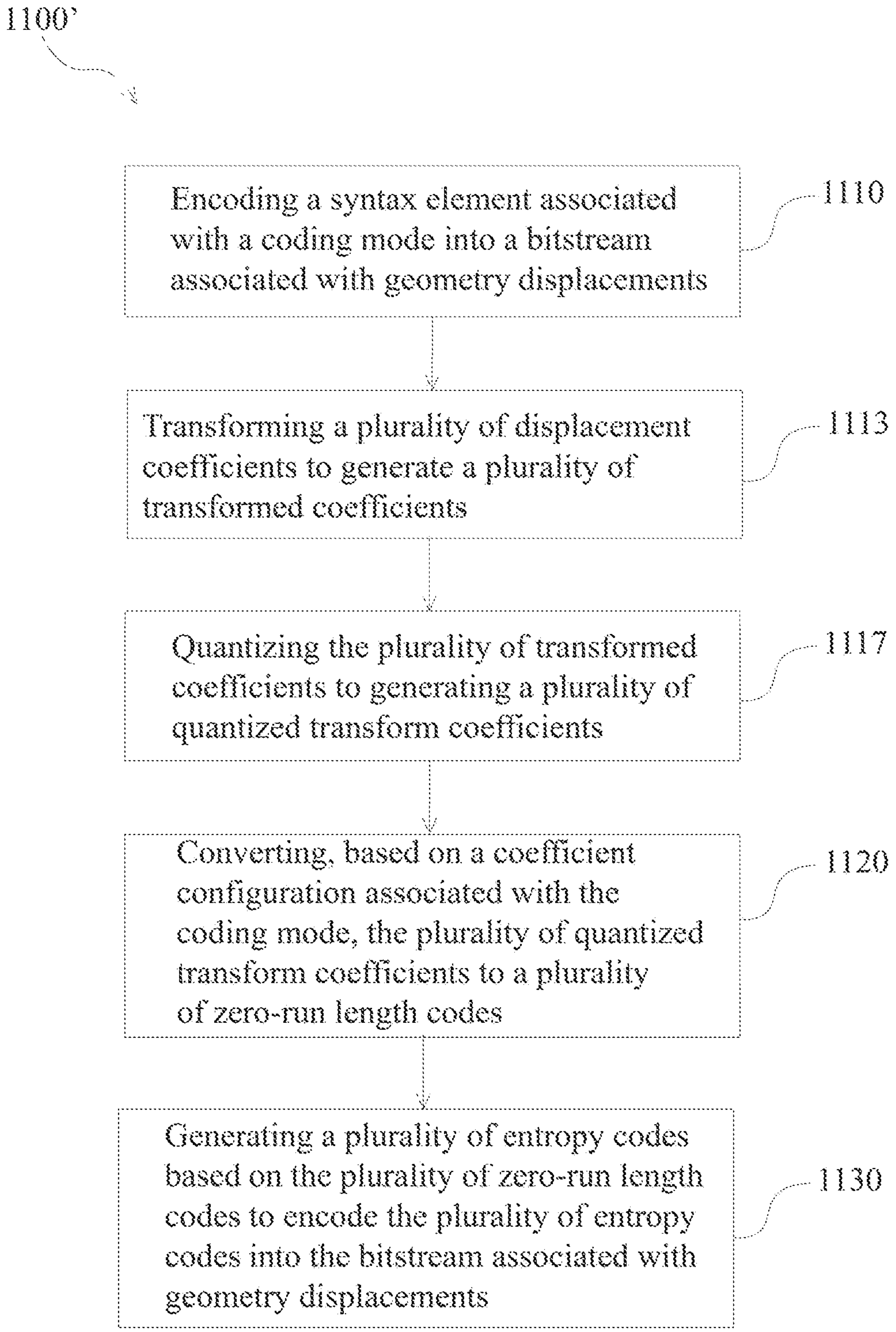
FIG. 11B shows a flowchart illustrating an encoding example of zero-run length coding combined with entropy coding, transform, and quantization according to an embodiment of the present disclosure.

For example, FIG. 11B shows a flowchart illustrating examples of zero-run length coding combined with entropy coding, transform, and quantization for coefficients to encode displacement components instead of using image/video encoding. As shown in FIG. 11B, a computer-implemented method 1100' is provided and includes boxes 1113, 1117, and 1130, in addition to boxes 1110 and 1120 shown in FIG. 11B that are also illustrated in boxes 1110 and 1120 shown in FIG. 11A described as above.

In some embodiments, as shown in FIG. 11B, the computer-implemented method 1100' further includes: box 1113, transforming a plurality of displacement coefficients to generate a plurality of transformed coefficients (such as processed with a wavelet transform).

In some embodiments, as shown in FIG. 11B, the computer-implemented method 1100' further includes: box 1117, quantizing a plurality of transformed coefficients to generating a plurality of quantized transform coefficients.

In some embodiments, as shown in FIG. 11B, the computer-implemented method 1100' further includes: box 1130, generating a plurality of entropy codes (such as a k-th order exp-Golomb code) based on the plurality of zero-run length codes to encode the plurality of entropy codes into the bitstream associated with geometry displacements.

In the present disclosure, zero-run length coding can remove parsing dependency in image/video coding and can be applied immediately after quantizing the first wavelet coefficient. In contrast, although the packing process for wavelet coefficients can start once the first wavelet coefficient is quantized, the video encoding process can only begin once the final wavelet coefficient has been packed into a 2D image.

Figure 12:
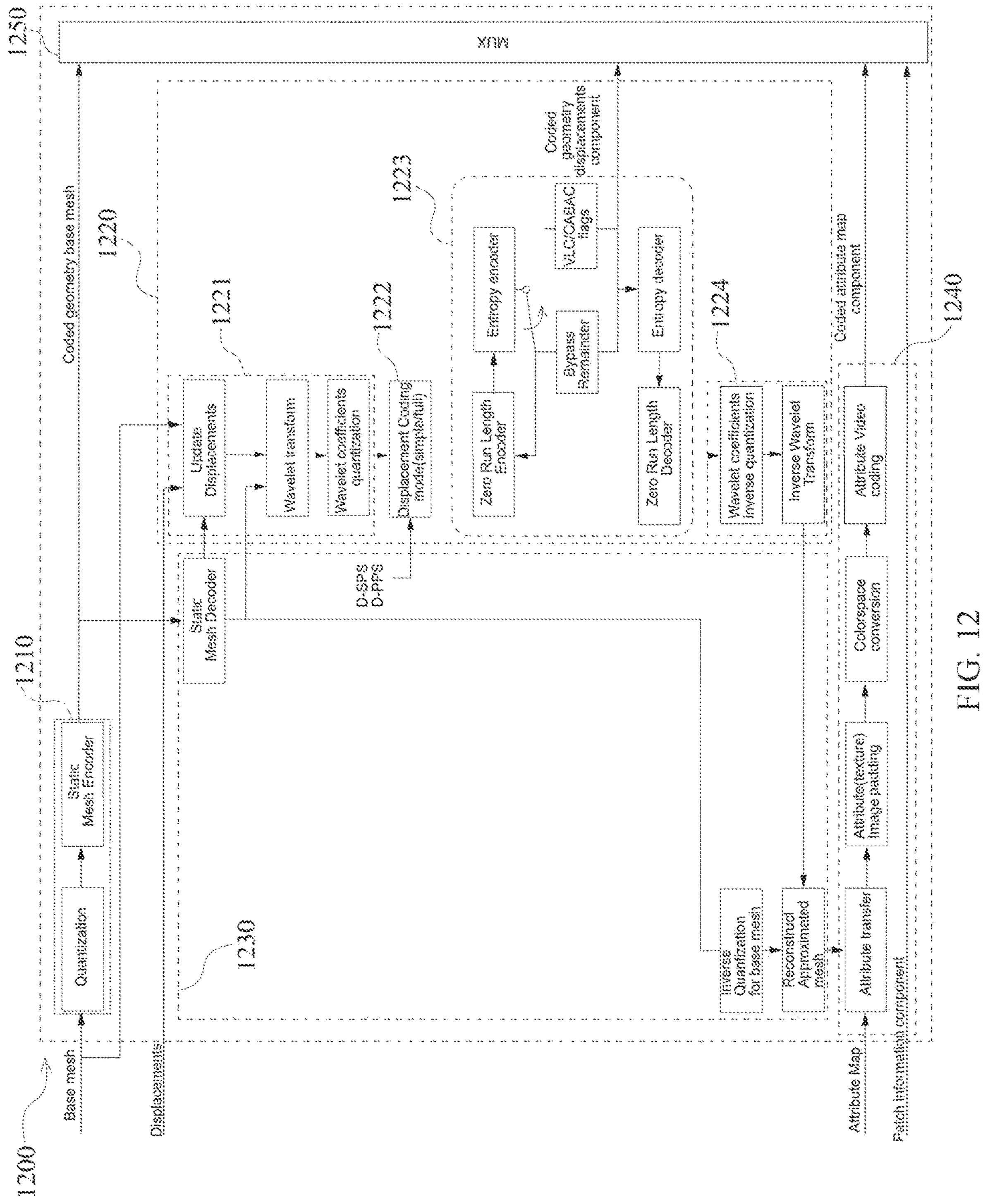
FIG. 12 shows a schematic diagram illustrating a generalized architecture for parametrized mesh coding with adaptive zero-run length displacements according to an embodiment of the present disclosure.

For example, FIG. 12 shows a schematic diagram illustrating a generalized architecture 1200 for parametrized mesh coding with adaptive zero-run length displacements is provided for description. FIG. 12 illustrates zero-run length coding combined with entropy coding for coefficients to decode/encode the displacement components. Understandably, zero-run length coding for coefficients to decode/encode the displacement components can be operated in the generalized architecture 1200. The generalized architecture 1200 includes a mesh coding part 1210, a displacements coding part 1220, a mesh reconstruction part 1230, an attribute map processing part 1240, and a multiplexer (MUX) 1250.

For example, as shown in FIG. 12, the mesh coding part 1210 can be configured to provide a function of processing data regarding a base mesh in quantization and static mesh encoding to generate coded geometry base mesh data. The displacements coding part 1220 can be configured to process data regarding displacements in updating, transform, quantization, non-video encoding (including zero-run length encoding, entropy encoding, entropy decoding, and zero-run length decoding), inverse quantization, and inverse transform, wherein coded geometry displacements component data can be generated in the non-video encoding without parsing dependency in video encoding. The mesh reconstruction part 1230 can be configured to process data processed by the mesh coding part 1210 in static mesh decoding, inverse quantization, and approximated mesh reconstruction. The attribute map processing part 1240 can be configured to process data regarding attribute map in video attribution, attribute (texture) image padding, color space conversion, and attribute video coding to generate coded attribute map component data. The multiplexer 1250 can be configured to multiplex data output from the mesh coding part 1210, the displacements coding part 1220, and the attribute map processing part 1240 to generate a coded bitstream.

For example, as shown in FIG. 12, the displacements coding part 1220 includes a pre-processing unit 1221, a coding-mode processing unit 1222, a displacement component codec 1223, post-processing unit 1224. The pre-processing unit 1221 can be configured to process data regarding displacements in updating, transform (such as wavelet transform), quantization. The coding-mode processing unit 1222 can be configured to encode or decode a syntax structure including a syntax element associated with a coding mode into/from a bitstream. The coding-mode processing unit 1222 and the pre-processing unit 1221 can be exchanged in a data processing flow for different application scenarios. The displacement component codec 1223 can be configured to process data regarding quantized wavelet coefficients in zero-run length encoding and entropy encoding to generate the coded geometry displacements component data and process the coded geometry displacements component data in entropy decoding and zero-run length decoding to reconstruct data regarding quantized wavelet coefficients. The post-processing unit 1224 can be configured to process data regarding quantized wavelet coefficients in inverse quantization, and inverse transform (such as inverse wavelet transform).

It should be understood that the quantized wavelet coefficients can be encoded as a zero-run sequence, e.g., per each zero coefficient, a number of consecutive zeroes can be encoded using schema A, and then a value regarding a non-zero coefficient, such as the non-zero coefficient minus one, can be encoded using schema B.

In the present disclosure, a flexible coding schema (e.g., a coding-mode assignment schema) can be provided to define a coefficient configuration such as a number of coded components and/or arrangement of coded components.

Figure 13:
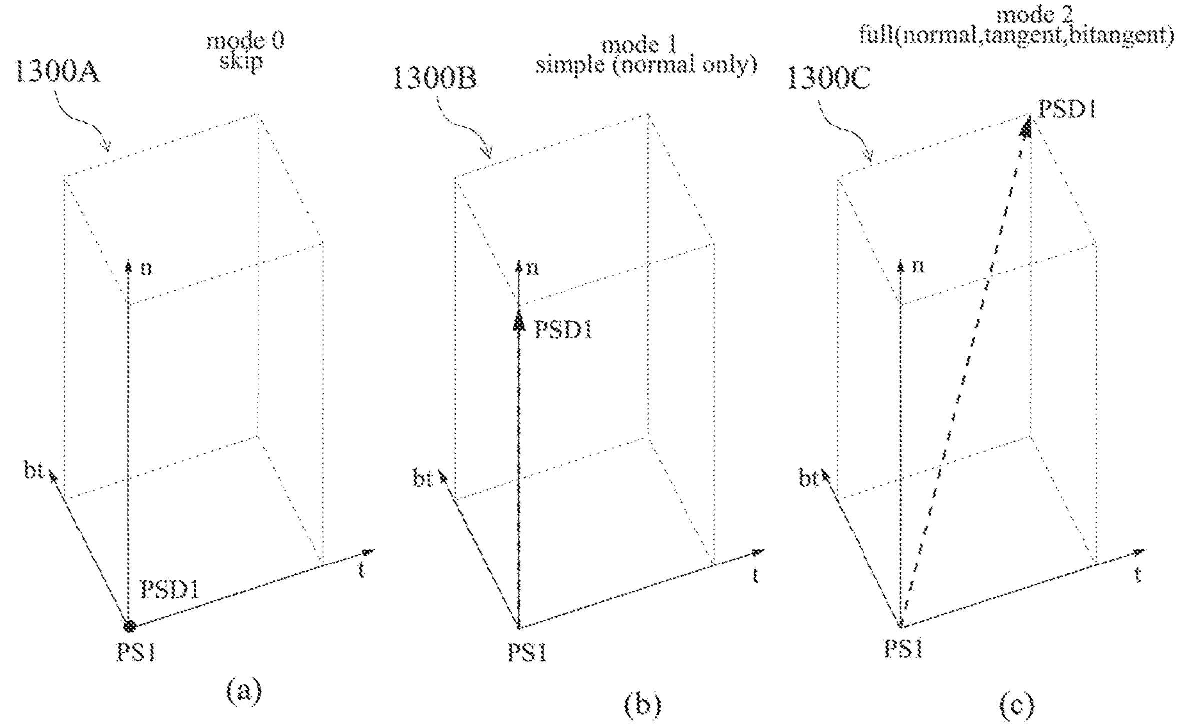
FIG. 13 shows a schematic diagram illustrating various displacement coding modes according to an embodiment of the present disclosure.

For example, FIG. 13 shows a schematic diagram illustrating various displacement coding modes. As shown in FIG. 13, if a displacement reconstruction in a skip mode (e.g., "mode 0") is defined as the coding mode, no information is transferred and encoded, e.g., a coordinate system 1300A illustrates that a zero vector at a position where a point PS1 coincides with a point PSD1; if a simple mode (e.g., "mode 1") is defined as the coding mode, only a normal component is transferred and encoded for the displacement, e.g., a coordinate system 1300B illustrates that a vector from a point PS1 to a point PSD1 only has a normal (n) component; and if a full mode (e.g., "mode 2") is defined as the coding mode, normal, tangent, and bitangent components are transferred and encoded in a bitstream, e.g., a coordinate system 1300C illustrates that a vector from a point PS1 to a point PSD1 has normal (n), tangent (t), and bitangent (bt) components.

For example, to indicate a selected coding mode, such as any one of mode 0 to 2, a decoder can use information present in a displacement regarding a sequence parameter set (SPS) for a sequence in a bitstream, that can be overridden by a displacement regarding a picture parameter set (PPS) for a particular frame. In an example, the coding mode may be adjusted per different LoD. For example, a particular instance of a displacement component that is characterized by it's presentation time and duration is referred to as displacement frame, or frame. For example, a face subdivision process can be implemented in several ways that depend on the original mesh content, to accommodate a topology and corresponding complexity of a mapping.

Figure 14:
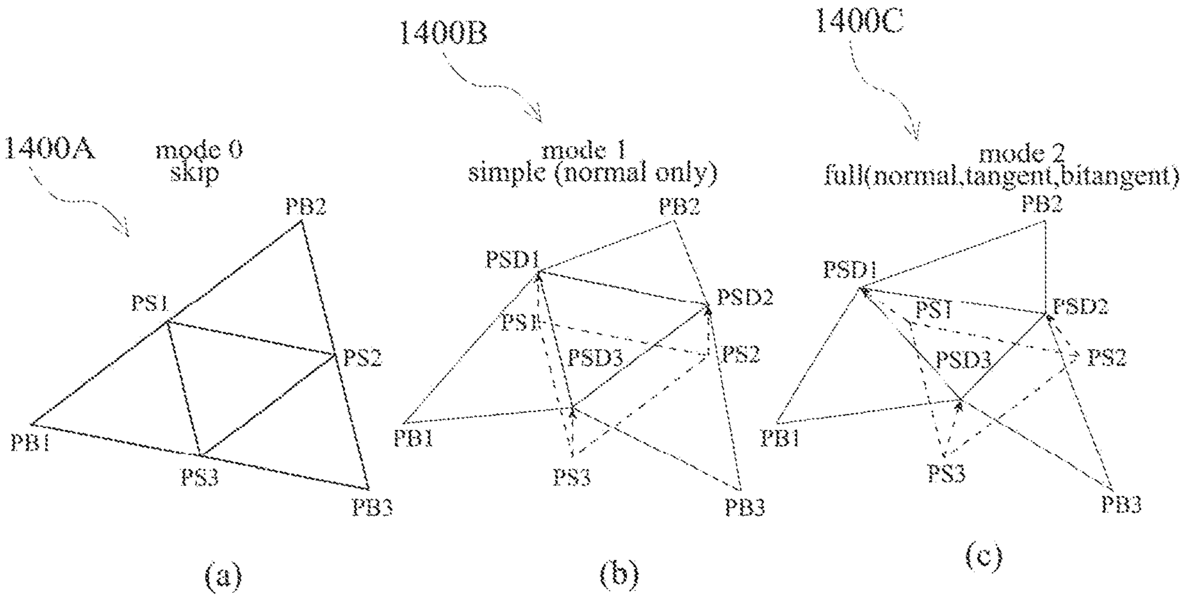
FIG. 14 shows a schematic diagram illustrating one face reconstruction example using various displacement component coding modes according to an embodiment of the present disclosure.

For example, FIG. 14 shows a schematic diagram illustrating one face reconstruction example using various displacement component coding modes. As shown in FIG. 14, an example of adaptive reconstruction of one face (such as being shown in FIG. 2) represented by a triangle defined by vertices PB1, PB2, and PB3 is provided. In FIG. 14, One face reconstruction example using various displacement component coding modes is illustrated. For example, as shown in FIG. 14, in a skip mode, subdivision vertices PS1, PS2, and PS3 are placed directly on corresponding edges of a face of a base mesh such as being defined by vertices PB1, PB2, and PB3, as shown in a face drawing 1400A; in a simple mode, there is a relationship regarding displacement in a normal direction between any one of pairs of displacement vertices, such as a pair of PS1 and PSD1, or a pair of PS2 and PSD2, or a pair of PS3 and PSD3, only a normal displacement component is applied to adjust positions of the subdivision vertices, as shown in a face drawing 1400B; in a full mode, there are relationships regarding displacements in directions between any one of pairs of the displacement vertices, three displacement components, such as normal, tangent, and bitangent components, are applied to a subdivision process, as shown in a face drawing 1400C.

In the present disclosure, the coding mode can be set in the current sequence by decoding a syntax element associated with a sequence parameter set.

In some embodiments, the decoding the syntax element associated with the coding mode from the bitstream associated with geometry displacements includes: decoding a syntax structure associated with a dynamic mesh sequence parameter set, including: decoding a syntax element associated with a dmsps-mesh-LoD-count-minus-1 code to determine a number of levels of details equal to a value of the dmsps-mesh-LoD-count-minus-1 code plus one; in response to determining that at least one syntax element associated with the coding mode is present, performing a respective one of a plurality of operation groups defined by a first iterative loop with a first variable from zero incremental to a maximum integer less than a sum of a value of the dmsps-mesh-LoD-count-minus-1 code plus one, including: decoding a syntax element associated with a dmsps-mesh-LoD-coding-mode code indexed by the first variable to determine the coding mode. The example is provided as below.

Correspondingly, the coding mode can be set in the current sequence by encoding a syntax element associated with a sequence parameter set.

In some embodiments, the encoding the syntax element associated with the coding mode into the bitstream associated with geometry displacements includes: encoding a syntax structure associated with a dynamic mesh sequence parameter set, including: encoding a syntax element associated with a dmsps-mesh-LoD-count-minus-1 code based on a value of a number of levels of details in a sequence minus one; performing a respective one of a plurality of operation groups defined by a first iterative loop with a first variable from zero incremental to a maximum integer less than a sum of a value of the dmsps-mesh-LoD-count-minus-1 code plus one, including: encoding a syntax element associated with a dmsps-mesh-LoD-coding-mode code indexed by the first variable based on the coding mode. The example is provided as below.

For example, FIG. 15 shows a table 1500 illustrating a syntax structure associated with a function, dmesh_sequence_parameter_set_rbsp( ) in which a descriptor “u(n)” for n being equal to a positive integer, such as 1, 3, 4, or . . . , is a n-bit(s) unsigned integer, and there are a syntax element “dmsps_sequence_parameter_set_id” and functions “dmesh_profile_tier_level( )” and “rbsp_trailing_bits( )”. It is noted that, in FIG. 15, as shown in a box 1510 between the functions “dmesh_profile_tier_level( )” and “rbsp_trailing_bits( )”, syntax element “dmsps_mesh_LoD_count_minus_1” is introduced, and a first iterative loop with a first variable i from 0 incremental to a maximum integer less than a value of (dmsps_mesh_LoD_count_minus_1+1) is also introduced. In the first iterative loop with the first variable i, operations are performed on each of different integers (such as 0, 1, 2, . . . ) defined by the first variable i, a syntax element “dmsps_mesh_LoD_coding_mode[i]” indexed with the first variable i is introduced, e.g., a displacement component coding mode will be finally set as the syntax element “dmsps_mesh_LoD_coding_modefil”.

For example, the syntax element “dmsps_mesh_LoD_count_minus_1” refers to a value of “dmsps_mesh_LoD_count_minus_1” plus one to indicate a number of level of details (LoD) for a displacement mesh sub-bitstream. In addition, the syntax element “dmsps_mesh_LoD_coding_mode[i]” refers to a coding mode used for displacement coefficients coding at LoD with an index “i” for the displacement sequence.

In some embodiments, in a decoding process, the decoding the syntax element associated with the dmsps-mesh-LoD-coding-mode code indexed by the first variable to determine the coding mode includes: in response to determining the first variable equal to zero, assigning the coding mode to a skip mode indicating no coded component of a single displacement coefficient; in response to determining the first variable equal to one, assigning the coding mode to a simple mode indicating only a normal component of a single displacement coefficient; and in response to determining the first variable equal to two, assigning the coding mode to a full mode indicating normal, tangent, and bitangent components of a single displacement coefficient.

In some embodiments, in an encoding process, the encoding the syntax element associated with the dmsps-mesh-LoD-coding-mode code indexed by the first variable based on the coding mode includes: in response to determining the first variable equal to zero, assigning the coding mode to a skip mode indicating no coded component of a single displacement coefficient; in response to determining the first variable equal to one, assigning the coding mode to a simple mode indicating only a normal component of a single displacement coefficient; and in response to determining the first variable equal to two, assigning the coding mode to a full mode indicating normal, tangent, and bitangent components of a single displacement coefficient.

For example, as shown in FIG. 16, which shows a table 1600 indicating various coding modes assigned by the syntax element “dmsps_mesh_LoD_coding_mode[i]”, if the index “i” is finally set to be equal to 0, the syntax element “dmsps_mesh_LoD_coding_mode[i]” indicates a skip mode; if index “i” is finally set to be equal to 1, the syntax element “dmsps_mesh_LoD_coding_mode[i]” indicates a simple mode; if index “i” is finally set to be equal to 2, the syntax element “dmsps_mesh_LoD_coding_mode[i]” indicates a full mode.

In an example, when the syntax element “dmsps_mesh_LoD_coding_mode[i]” is not present, the syntax element “dmsps_mesh_LoD_coding_mode[i]” is inferred to be equal to 2 that indicates the full mode.

In some embodiments, the decoding the syntax structure associated with the dynamic mesh sequence parameter set further includes: in response to determining that at least one syntax element associated with the coding mode is not present, assigning the coding mode to a full mode indicating normal, tangent, and bitangent components of a single displacement coefficient.

In addition, if the index “i” is finally set to be equal to any value greater than 2, the syntax element “dmsps_mesh_LoD_coding_mode[i]” can be configured to indicate other coding modes reserved for another application scenarios.

In the present disclosure, in a decoding process, if a number of level of details (LoD) is different for the current frame and the current sequence, then the coding mode can be override in the current frame by decoding a syntax element associated with a picture parameter set.

In some embodiments, the decoding the syntax element associated with the coding mode from the bitstream associated with geometry displacements includes: decoding a syntax structure associated with a dynamic mesh picture parameter set, including: decoding a syntax element associated with a dmpps-mesh-LoD-count-override-flag code indicating a number of levels of details different in a frame and a sequence; in response to determining the dmpps-mesh-LoD-count-override-flag code equal to one, performing operations including: decoding a syntax element associated with a dmpps-mesh-LoD-count-minus-1 code to determine the number of levels of details equal to a value of the dmpps-mesh-LoD-count-minus-1 code plus one; in response to determining that at least one syntax element associated with the coding mode is present, performing a respective one of a plurality of operation groups defined by a second iterative loop with a second variable from zero incremental to a maximum integer less than a sum of a value of the dmpps-mesh-LoD-count-minus-1 code plus one, including: decoding a syntax element associated with a dmpps-mesh-LoD-coding-mode code indexed by the second variable to determine the coding mode. The example is provided as below.

Correspondingly, in an encoding process, if a number of level of details (LoD) is different for the current frame and the current sequence, then the coding mode can be override in the current frame by encoding a syntax element associated with a picture parameter set.

In some embodiments, the encoding the syntax element associated with the coding mode into the bitstream associated with geometry displacements includes: encoding a syntax structure associated with a dynamic mesh picture parameter set, including: encoding a syntax element associated with a dmpps-mesh-LoD-count-override-flag code indicating a number of levels of details different in a frame and a sequence; in response to determining the dmpps-mesh-LoD-count-override-flag code equal to one, performing operations including: encoding a syntax element associated with a dmpps-mesh-LoD-count-minus-1 code based on a value of the number of levels of details in a picture minus one; performing a respective one of a plurality of operation groups defined by a second iterative loop with a second variable from zero incremental to a maximum integer less than a sum of a value of the dmpps-mesh-LoD-count-minus-1 code plus one, including: encoding a syntax element associated with a dmpps-mesh-LoD-coding-mode code indexed by the second variable based on the coding mode. The example is provided as below.

For example, FIG. 17 shows a table 1700 illustrating a syntax structure associated with a function, dmesh_picture_parameter_set_rbsp( ), in which a descriptor "u(n)" for n being equal to a positive integer, such as 1, 3, 4, or . . . , is a n-bit(s) unsigned integer, and there are a syntax element "dmpps_sequence_parameter_set_id" and a function "rbsp_trailing_bits( )". It is noted that, in FIG. 17, as shown in a box 1710 between the syntax element "dmpps_sequence_parameter_set_id" and the function "rbsp_trailing_bits( )", a syntax element "dmpps_mesh_LoD_count_override_flag" is introduced. In addition, a condition of the syntax element "dmpps_mesh_LoD_count_override_flag" equal to a specified value (such as not equal to zero, e.g., equal to "1" or "TRUE") is also introduced. If the condition of the syntax element "dmpps_mesh_LoD_count_override_flag" equal to the specified value is established, a syntax element "dmpps_mesh_LoD_count_minus_1" is introduced, and a second iterative loop with a second variable i from 0 incremental to a maximum integer less than a value of (dmsps_mesh_LoD_count_minus_1+1) is also introduced. In the first iterative loop with the second variable i, operations are performed on each of different integers (such as 0, 1, 2, . . . ) defined by the second variable i, a syntax element "dmpps_mesh_LoD_coding_mode[i]" indexed with the second variable i is introduced, e.g., a displacement component coding mode will be finally set as the syntax element "dmpps_mesh_LoD_coding_mode[i]".

For example, the syntax element "dmpps_mesh_LoD_count_override_flag" refers to a binary value that indicates that a number of level of details (LoD) is different for the current frame and the current sequence. In addition, the syntax element "dmpps_mesh_LoD_count_minus_1" refers to a value of "dmsps_mesh_LoD_count_minus_1" plus one to indicate a number of level of details (LoD) for the current displacement mesh picture. Further, the syntax element "dmpps_mesh_LoD_coding_mode[i]" refers to a coding mode used for displacement coefficients coding at LoD with an index "i" for the current picture.

In some embodiments, in a decoding process, the decoding the syntax element associated with the dmpps-mesh-LoD-coding-mode code indexed by the second variable to determine the coding mode includes: in response to determining the second variable equal to zero, assigning the coding mode to a skip mode indicating no coded component of a single displacement coefficient, in response to determining the second variable equal to one, assigning the coding mode to a simple mode indicating only a normal component of a single displacement coefficient; and in response to determining the second variable equal to two, assigning the coding mode to a full mode indicating normal, tangent, and bitangent components of a single displacement coefficient.

In some embodiments, in an encoding process, the encoding the syntax element associated with the dmpps-mesh-LoD-coding-mode code indexed by the second variable based on the coding mode includes: in response to determining the second variable equal to zero, assigning the coding mode to a skip mode indicating no coded component of a single displacement coefficient; in response to determining the second variable equal to one, assigning the coding mode to a simple mode indicating only a normal component of a single displacement coefficient; and in response to determining the second variable equal to two, assigning the coding mode to a full mode indicating normal, tangent, and bitangent components of a single displacement coefficient.

For example, an shown in FIG. 18, which shows a table 1800 indicating various coding modes assigned by syntax element "dmpps_mesh_LoD_coding_mode[i]", if the index "i" is finally set to be equal to 0, the syntax element "dmpps_mesh_LoD_coding_mode[i]" indicates a skip mode; if index "i" is finally set to be equal to 1, the syntax element "dmpps_mesh_LoD_coding_mode[i]" indicates a simple mode; if index "i" is finally set to be equal to 2, the syntax element "dmpps_mesh_LoD_coding_mode[i]" indicates a full mode.

In an example, when the syntax element "dmpps_mesh_LoD_coding_mode[i]" is not present, the syntax element "dmsps_mesh_LoD_coding_mode[i]" is inferred to be equal to 2 that indicates the full mode.

In some embodiments, the decoding the syntax structure associated with the dynamic mesh picture parameter set further includes: in response to determining that at least one syntax element associated with the coding mode is not present, assigning the coding mode to a full mode indicating normal, tangent, and bitangent components of a single displacement coefficient.

In addition, if the index "i" is finally set to be equal to any value greater than 2, the syntax element "dmpps_mesh_LoD_coding_mode[i]" can be configured to indicate other coding modes reserved for another application scenarios.

In the present disclosure, a method for zero-run length coding provided for coefficients to encode/decode displacement components instead of using an image/video encoder removes the parsing dependency and can be applied immediately after quantizing the first wavelet coefficient. In contrast, in the related art, a packing process for wavelet coefficients can start once the first wavelet coefficient is quantized, but a video encoding process can only begin once the final wavelet coefficient has been packed into a 2D image.

For example, in the present disclosure, zero-run length coding can be configured to either encode/decode a value of a symbol, or to encode/decode a number of consecutive zero coefficients along a space scanning pattern, e.g., a number of consecutive zero coefficients are scanned along a 3D space scanning pattern, such as Morton, Hilbert, or other order.

It should be noted that the wavelet transform is a hierarchical multiresolution transform, hence the statistical characteristics of the displacement components shall vary for different levels of the wavelet transform. Correspondingly, transformed normal, tangent, and bitangent components have different distribution characteristics as well. In an example, each of transform coefficients represents a three-dimensional data (such as displacement components decomposed in the coordinate system shown in FIG. 3), each of displacement components is suggested to be processed in a specified order within each of level of details.

In the present disclosure, an example of an encoding process is provided for illustration to efficiently encode geometry displacement coefficients in a mesh content including several stages as discussed below.

Stage 1: Mesh segmentation is provided to create segments or blocks of mesh content representing individual objects/regions of interest/volumetric tiles, semantic blocks, etc.

Stage 2: Mesh decimation is provided to create a base mesh, wherein the base mesh can be encoded with an undefined static mesh encoder. Correspondingly, the base mesh can be decoded and recursively subdivided to the level defined by the encoder.

Stage 3: Mesh displacements are calculated for each LoD according to a coding mode provided in the syntax element "dmsps_mesh_LoD_coding_mode[i]" or "dmpps_mesh_LoD_coding_mode[i]".

Stage 4: Mesh displacements are calculated between the subdivided mesh and the original surface for each LoD based on the coding mode. For example, for the skip mode, no displacement component is transmitted; for the simple mode, displacements belonging to the normal (n) component are processed with a wavelet transform; for the full mode, displacements belonging to the normal, tangent, and bitangent (n, t, and bt) components are processed with a wavelet transform.

Stage 5: Transformed wavelet coefficients if present such as $\psi_n$, $\psi_t$, and $\psi_{bt}$ are converted to a fix-point representation with a precision indicated in a coded bitstream at either slice, picture, or sequence level.

Figure 19A:
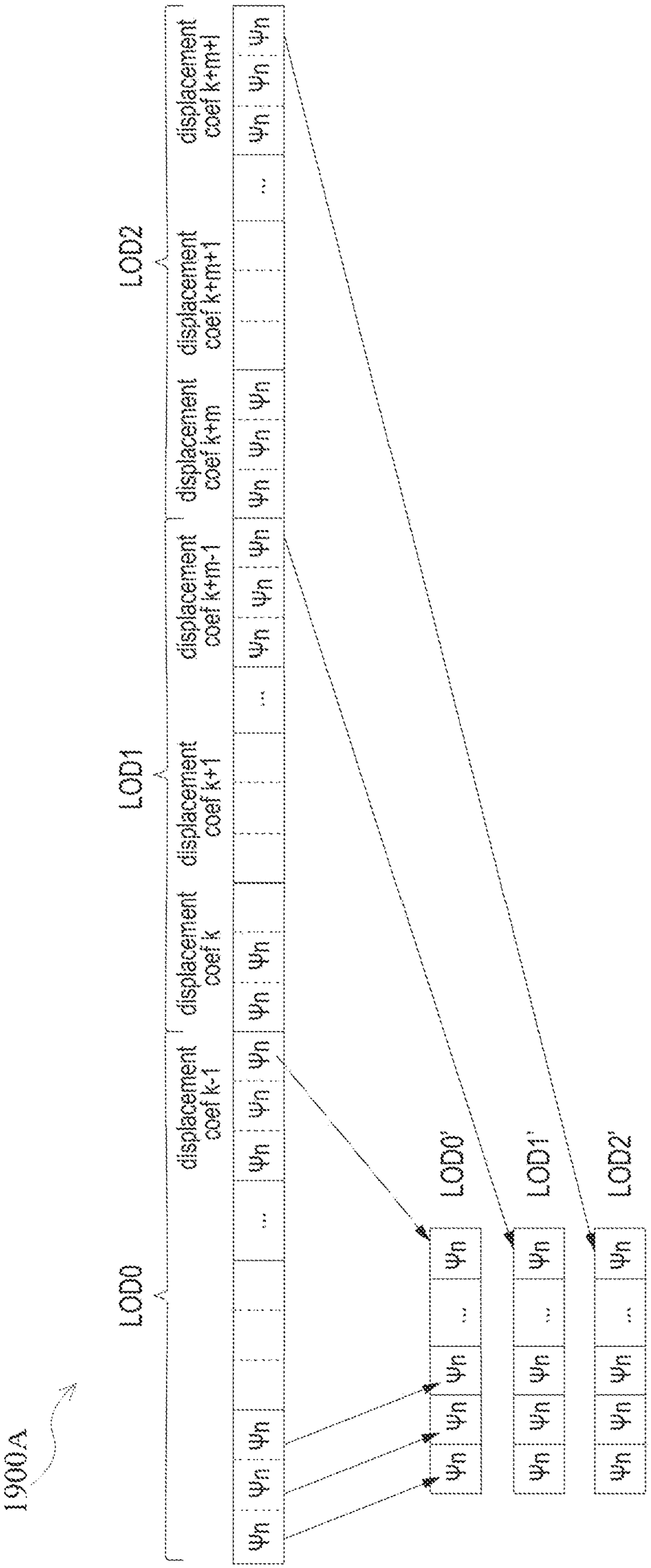
FIG. 19A shows a simple mode used in LoD-based component-major data representation for displacement-wavelet-coefficients component according to an embodiment of the present disclosure.
Figure 19B:
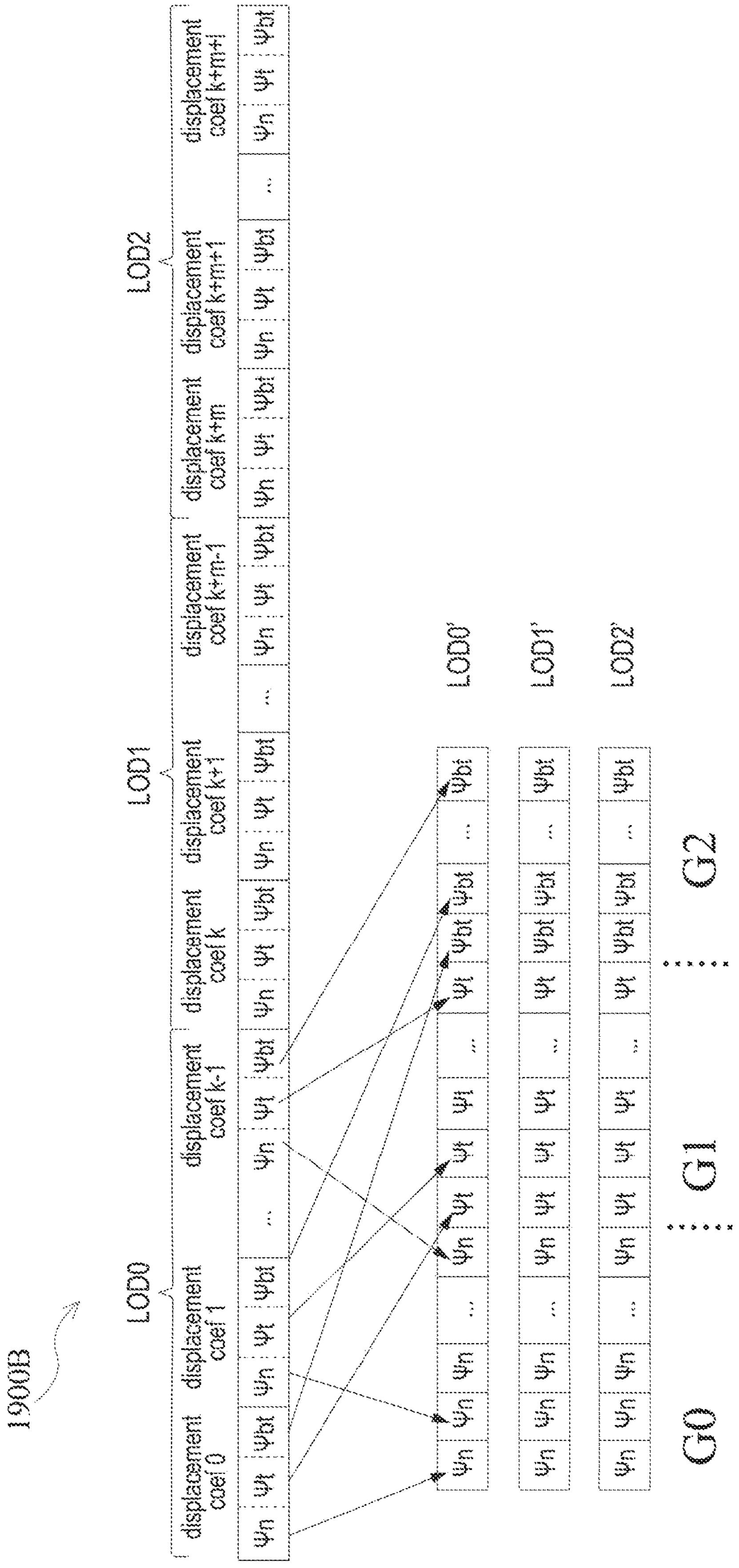
FIG. 19B shows a full mode used in LoD-based component-major data representation for displacement-wavelet-coefficients component according to an embodiment of the present disclosure.

Stage 6: Quantized wavelet coefficients if present such as $\psi_n$, $\psi_t$, and $\psi_{bt}$ are scanned along a 3D space scanning pattern (e.g. Morton, Hilbert, or other order) within each LoD forming three 1-dimensional arrays per each component. For example, as shown in FIG. 19A, in an arrangement drawing 1900A, different displacement coefficients $\psi_n$ are rearranged from LOD0 to LOD0', from LOD1 to LOD1', and LOD2 to LOD2' for the simple mode; as shown in FIG. 19B, in an arrangement drawing 1900B, different displacement coefficients $\psi_n$, $\psi_t$, and $\psi_{bt}$ are rearranged from LOD0 to LOD0', from LOD1 to LOD1', and LOD2 to LOD2' for the full mode. In FIG. 19B, different types of displacement coefficients (such as $\psi_n$, $\psi_t$, and $\psi_{bt}$) are sequencially arranged in LOD0, LOD1, and LOD2; and each of three group G0, G1, and G2 in LOD0', LOD1', and LOD2' has a same type of displacement coefficients (such as $\psi_n$, $\psi_t$, or $\psi_{bt}$). Then, the quantized wavelet coefficients that are scanned are further converted to zero-run length code. Corresponding zero-runs and non-zero coefficients are encoded as described in FIG. 20 and FIG. 21. Then, entropy encoding can be applied.

Figure 20:
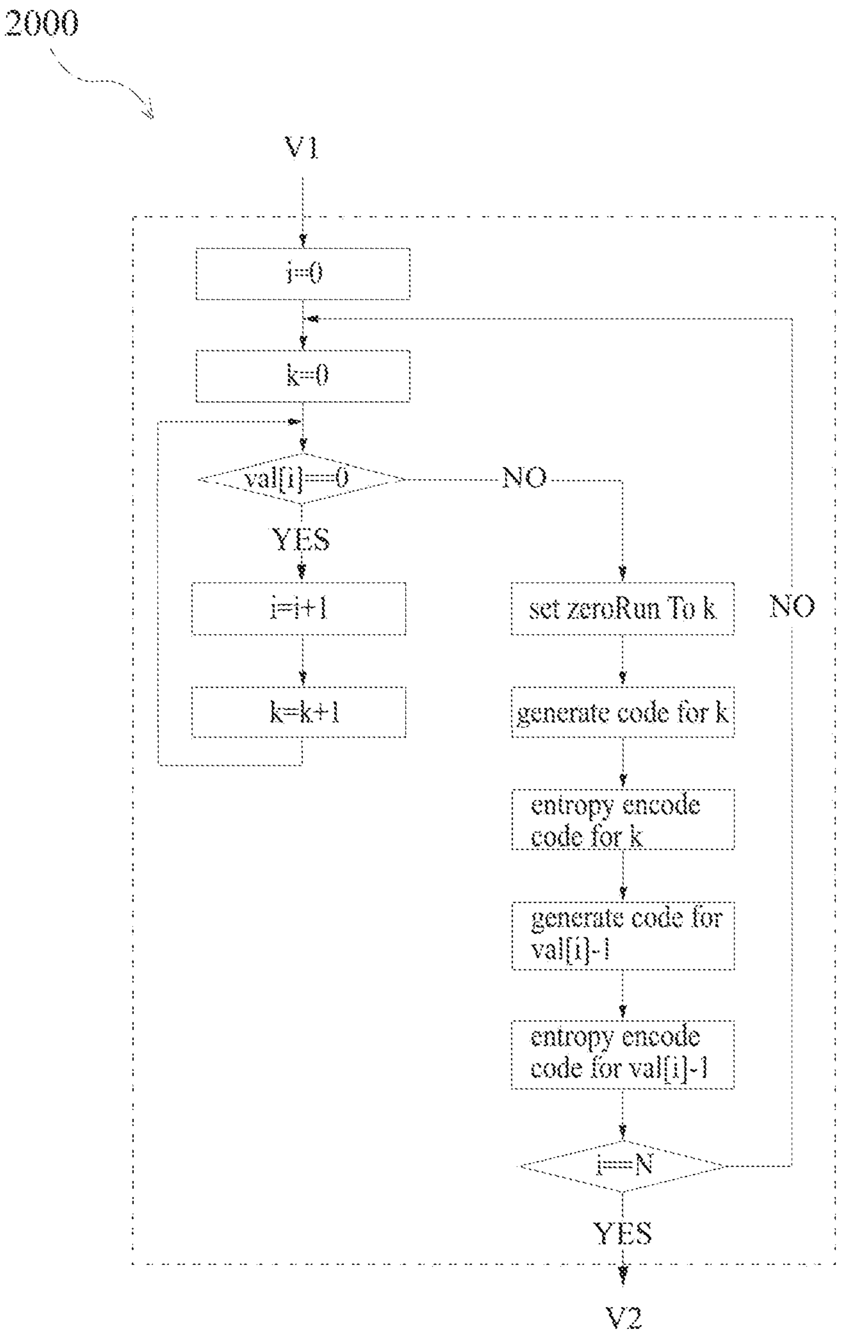
FIG. 20 shows a flowchart illustrating zero-run length coding for quantized coefficients that can be applied to embodiments of the present disclosure.

In an example, FIG. 20 shows a flowchart illustrating zero-run length coding for quantized coefficients. In FIG. 20, a data processing schema 2000 for zero-run length coding and entropy coding is provided, in which input data V1 (such as one of quantized transform coefficients) can be each of elements in an array val[ ] whose size is N, and output data V2 is a coded bitstream for array val[ ]. In the data processing schema 2000, a zero-run length (k) can be set when one of non-zero coefficients is found. For example, an absolute value of a non-zero coefficient minus one and a corresponding sign can be encoded for a non-zero coefficient that is coded. In an example, the zero-run length and non-zero coefficients may share a same coding schema or may use different schemas for entropy encoding. For example, a value of zero-run length can be encoded by using a method provided as below, but is not limited thereto.

For example, a parity flag may be set to 1 to signal if a parity of value is an odd number for one application; the parity flag may be set to 0 to signal if the parity of value is an odd number for another application. In addition, the value may be the absolute value itself or absolute value minus I if the absolute value itself is non-zero.

For example, a coding algorithm for a value val[i] can be implemented as a combination of context-coded flags and a bypass-coded binarized reminder, expressed as below:

$$val[i] = gt0 + gt1 + \ldots + gtK + \text{parity} + (gtN1 + gtN2 + \ldots + gtN1 + \text{remainder}) * 2,$$

wherein gt0, gt1, . . . , and gtK are flags that represent if the value is greater than a corresponding value of 0, 1 . . . , and K, and the gtN1, gtN2, . . . , and gtN1 correspond to doubled values of N1, N2, . . . , and N1.

In the present example, all values of the flags are binary and can be encoded using an arithmetic encoder either with one context model per flag or using one context model for all of the flags. In addition, the remainder may be binarized using exponential Golomb code or other binarization methods and encoded using a bypass mode. The details of operations of the encoder are described in FIG. 20. For example, the values k and i in FIG. 20 represent a number of greater than the values of flags, e.g., if k=2 and i=3, the coded flags are gt0, gt1, gtN1, gtN2, and gtN3. Further, the remainder is expressed as below:

$$\text{remainder} = \frac{1}{2}\ \text{value} - \sum_{i=0}^{k} gt\_i - \left(2 * \sum_{j=0}^{l} gtN\_j\right).$$

Figure 21:
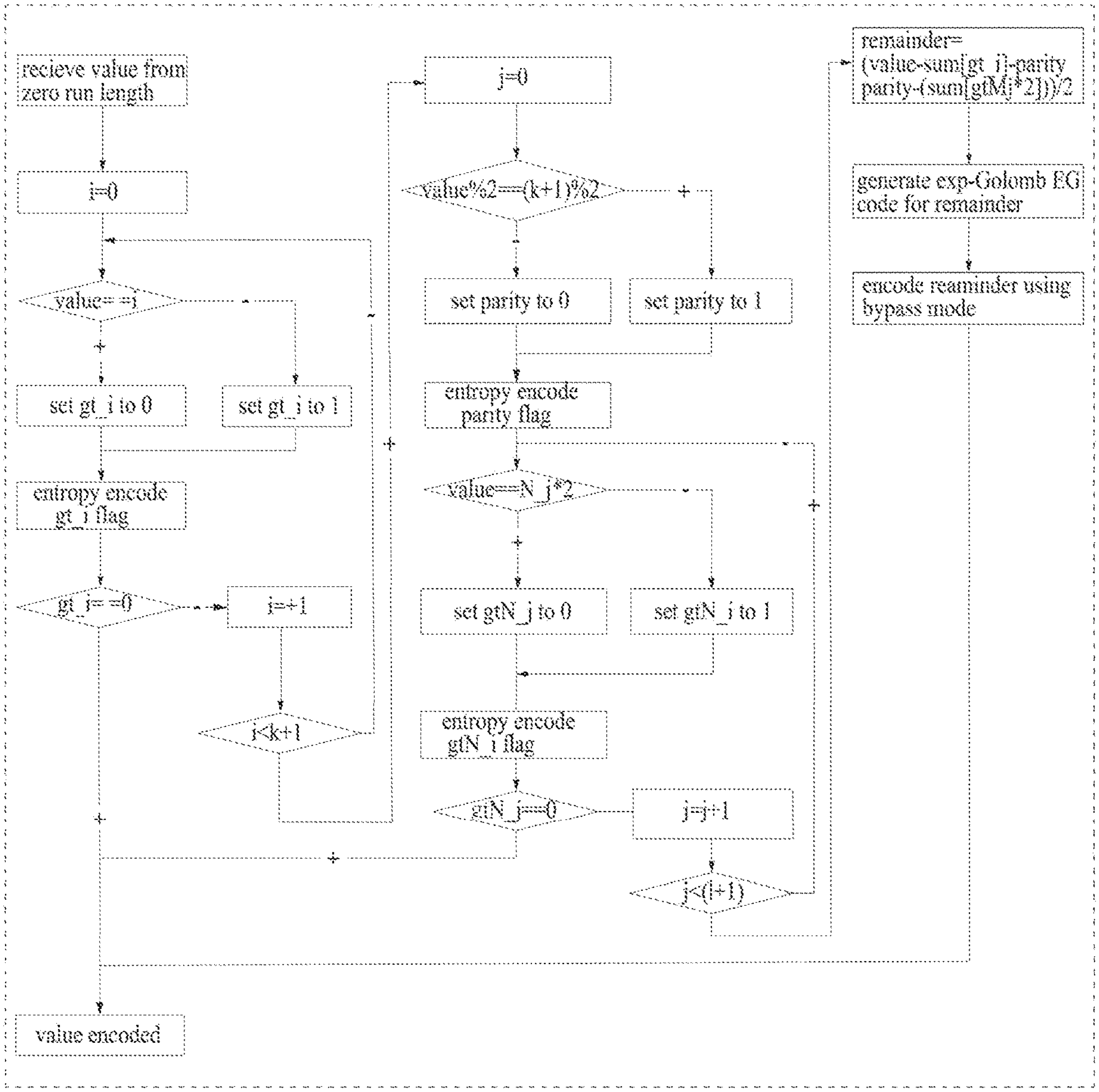
FIG. 21 shows a flowchart illustrating a generic schema for coding a zero-run length value that can be applied to embodiments of the present disclosure.

In another example, FIG. 21 shows a flowchart illustrating a generic schema 2100 for coding a zero-run length value. For example, a generalization of a k-th order Exp-Golomb binarization process is described below. In an example of non-zero code, a sign bit encoded to 1 indicates a positive number, and the sign bit encoded to 0 indicates a negative number as below:

$$\text{coefficient} = (2*\text{sign}-1)*(gt0+gt1+\ldots+gtK+\text{parity}+(gtN1+gtN2+\ldots+gtN1+\text{remainder})*2+1),$$

wherein the coefficient is a non-zero wavelet coefficient, and the sign is a binary.

For example, in a bin string of a k-th order Exp-Golomb binarization process for each value symbolVal, c(i) discussed above is specified as follows, wherein each call of a function put(X), with X equal to 0 or 1, adds the binary value X at the end of the bin string.

```
absV = Abs( symbolVal )
stopLoop = 0
do
if( absV >= ( 1 << k ) ) {
   put( 1 )
   absV = absV − ( 1 << k )
   k++
} else {
   put( 0 )
   while( k— )
      put( ( absV >> k ) & 1 )
   stopLoop = 1
}
while( !stopLoop )
```

In other examples of the k-th order exp-Golomb coding, the order of exp-Golomb code can be fixed or signalled in the bitstream. For example, k-th Exp-Golomb coding examples are provided in a table 2200 shown in FIG. 22.

In the present disclosure, an example of an decoding process is provided. The decoding process is the inverse of the encoding process and several stages as discussed below.

Stage 1: The base mesh is decoded from a bitstream for geometry and recursively subdivided to level of details defined by the encoder.

Stage 2: A coded bitstream for geometry displacements is obtained and decoded with an entropy decoder using a bypass or context adaptive decoder. The number of coded elements in a displacement vector is indicated by the coding mode in the syntax element "dmsps_mesh_LoD_coding_mode[i]" or "dmpps_mesh_LoD_coding_mode[i]". For example, the value of "dmsps_mesh_LoD_coding_mode[i]" persists for the duration of the sequence, when the value from "dmpps_mesh_LoD_coding_mode[i]" is present, it is applied for the frame it is associated with. It is noted that the decoding process can be terminated at any given incremental level of details. It is not required to decode all the elements of the displacement coefficients for the mesh reconstruction.

Stage 3: Flags and corresponding syntax elements are decoded from the bitstream using context coding for flags and de binarization of bypass coded remainder.

Stage 4: Each of values of coded displacement wavelet coefficients is reconstructed using a following expression:

$$\text{value} = \left(\sum_{i=0}^{k} gt_i + \text{parity} + \left(\text{remainder} + \sum_{j=0}^{l} gtN_j\right)*2\right)*(2*\text{sign}-1).$$

In some embodiments, as shown at the box 1015 in FIG. 10B, the decoding the plurality of entropy codes from the bitstream associated with geometry displacements to reconstruct the plurality of zero-run length codes based on the plurality of entropy codes includes: decoding each of the plurality of entropy codes including a combination of a parity flag, a plurality of context-coded flags, a bypass-coded binarized reminder, and a sign to reconstruct one of the plurality of zero-run length codes including a plurality of non-zero parts, wherein a value of each of the non-zero parts plus one is calculated to determine one of the plurality of quantized transform coefficients.

In addition, for zero-run length wavelet coefficients, each of values is reconstructed using a following expression:

$$\text{value} = \sum_{i=0}^{k} gt\_i + \text{parity} + \left(\text{remainder} + \sum_{j=0}^{l} gtN\_j\right)*2.$$

It is noted that the value of k and i may be different for zero-run length and coefficient coding.

In some embodiments, as shown at the box 1015 in FIG. 10B, the decoding the plurality of entropy codes from the bitstream associated with geometry displacements to reconstruct the plurality of zero-run length codes based on the plurality of entropy codes includes: decoding each of the plurality of entropy codes comprising a combination of a parity flag, a plurality of context-coded flags, and a bypass-coded binarized reminder to reconstruct one of the plurality of zero-run length codes including a plurality of zero-run parts to determine at least one of the plurality of quantized transform coefficients equal to zero.

Stage 5: The displacement wavelet coefficients are processed with an inverse quantization and an inverse wavelet transform.

Stage 6: Mesh displacements are applied to the subdivided base mesh at each level of transform recursively to generate the reconstructed mesh consisting of blocks representing individual objects/regions of interest/volumetric tiles, semantic blocks, etc.

Figure 23:
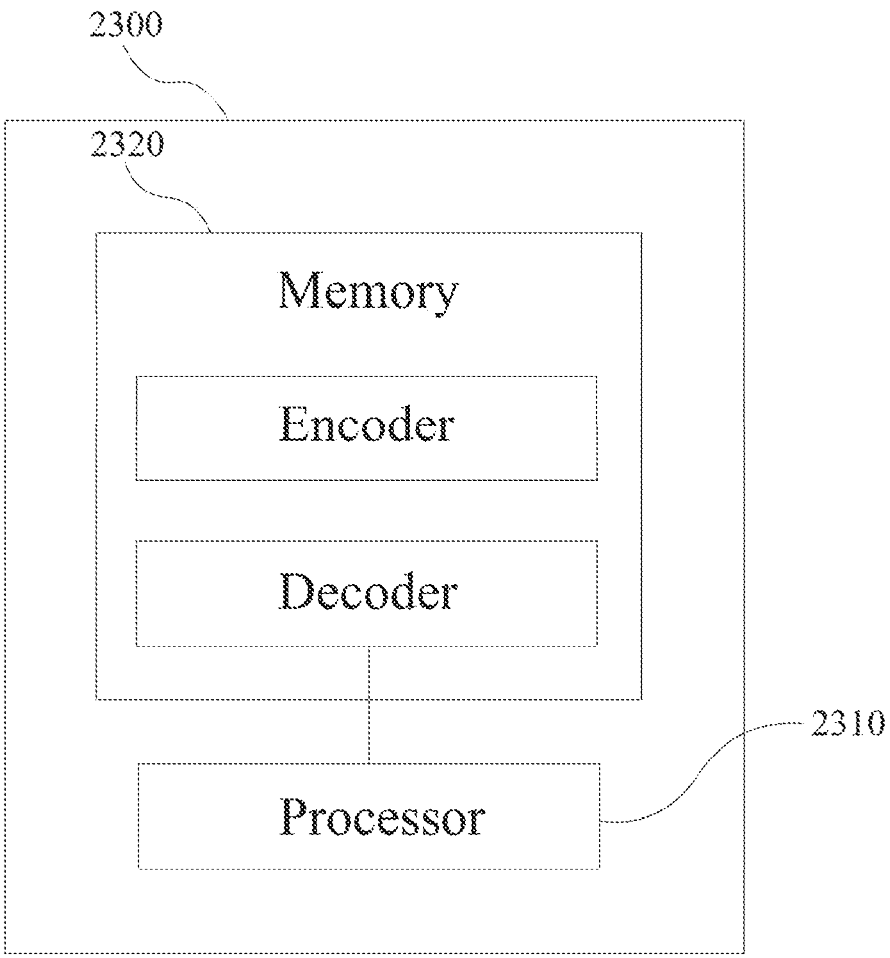
FIG. 23 shows an example of a computing device that can be applied to embodiments of the present disclosure.

Further, any suitable computing system can be used for performing the operations for replacement information encoding like an encoder or replacement information decoding like a decoder described herein. For example, FIG. 23 depicts an example of a computing device 2300 that can implement methods such as computer-implemented methods for an encoding process or a decoding process herein.

In some embodiments, the computing device 2300 can include a processor 2310 that is coupled to a memory 2320 and is configured to execute program instructions stored in the memory 2320 to perform the operations for implementing a computer-implemented method associated with an encoder or a decoder.

For example, the processor 2310 may comprise a microprocessor, an application-specific integrated circuit ("ASIC"), a state machine, or other processing device. The processor 2310 can include one or more processing units. Such a processor can include or may be in communication with a computer-readable medium storing instructions that, when executed by the processor 2310, cause the processor to perform the operations described herein. The memory 2320 can include any suitable non-transitory computer-readable medium.

For example, the computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer programming language, including, for example, C, C++, C#, Visual Basic, Java, Python, Perl, JavaScript, and Action Script.

In some embodiments, the present disclosure provides that a system includes: a processor; and a memory coupled to the processor, wherein the processor is configured to execute program instructions stored in the memory to perform any one of the above computer-implemented methods regarding an encoding process.

In some embodiments, the present disclosure provides that a non-transitory computer-readable medium having program code stored thereon, the program code executable by a processor to execute any one of the above computer-implemented methods regarding an encoding process.

In some embodiments, the present disclosure provides that a system includes: a processor; and a memory coupled to the processor, wherein the processor is configured to execute program instructions stored in the memory to perform any one of the above computer-implemented methods regarding a decoding process.

In some embodiments, the present disclosure provides that a non-transitory computer-readable medium having program code stored thereon, the program code executable by a processor to execute any one of the above computer-implemented methods regarding a decoding process.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan provided by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A decoding method, comprising:
- decoding a syntax element associated with a coding mode from a bitstream associated with geometry displacements; and
- reconstructing, based on a coefficient configuration associated with the coding mode, a plurality of quantized transform coefficients from a plurality of zero-run length codes;
- wherein the decoding the syntax element associated with the coding mode from the bitstream associated with geometry displacements comprises:
  - decoding a syntax structure associated with a dynamic mesh sequence parameter set, comprising:
  - decoding a syntax element associated with a dmsps-mesh-LoD-count-minus-1 code to determine a number of levels of details equal to a value of the dmsps-mesh-LoD-count-minus-1 code plus one;
  - in response to determining that at least one syntax element associated with the coding mode is present, performing a respective one of a plurality of operation groups defined by a first iterative loop with a first variable from zero incremental to a maximum integer less than a sum of a value of the dmsps-mesh-LoD-count-minus-1 code plus one, comprising:
  - decoding a syntax element associated with a dmsps-mesh-LoD-coding-mode code indexed by the first variable to determine the coding mode.

2. The method of claim 1, wherein the decoding the syntax element associated with the dmsps-mesh-LoD-coding-mode code indexed by the first variable to determine the coding mode comprises:
- in response to determining the first variable equal to zero, assigning the coding mode to a skip mode indicating no coded component of a single displacement coefficient;
- in response to determining the first variable equal to one, assigning the coding mode to a simple mode indicating only a normal component of a single displacement coefficient; and in response to determining the first variable equal to two, assigning the coding mode to a full mode indicating normal, tangent, and bitangent components of a single displacement coefficient.

3. The method of claim 1, wherein the decoding the syntax structure associated with the dynamic mesh sequence parameter set further comprises:

in response to determining that at least one syntax element associated with the coding mode is not present, assigning the coding mode to a full mode indicating normal, tangent, and bitangent components of a single displacement coefficient.

4. The method of claim 1, further comprising:

decoding a plurality of entropy codes from the bitstream associated with geometry displacements to reconstruct the plurality of zero-run length codes based on the plurality of entropy codes.

5. The method of claim 4, wherein the decoding the plurality of entropy codes from the bitstream associated with geometry displacements to reconstruct the plurality of zero-run length codes based on the plurality of entropy codes comprises:

decoding each of the plurality of entropy codes comprising a combination of a parity flag, a plurality of context-coded flags, and a bypass-coded binarized remainder to reconstruct one of the plurality of zero-run length codes comprising a plurality of zero-run parts to determine at least one of the plurality of quantized transform coefficients equal to zero.

6. The method of claim 4, wherein the decoding the plurality of entropy codes from the bitstream associated with geometry displacements to reconstruct the plurality of zero-run length codes based on the plurality of entropy codes comprises:

decoding each of the plurality of entropy codes comprising a combination of a parity flag, a plurality of context-coded flags, a bypass-coded binarized remainder, and a sign to reconstruct one of the plurality of zero-run length codes comprising a plurality of non-zero parts, wherein a value of each of the non-zero parts plus one is calculated to determine one of the plurality of quantized transform coefficients.

7. The method of claim 1, further comprises:

inversely quantizing the plurality of quantized transform coefficients to reconstruct a plurality of transformed coefficients.

8. The method of claim 7, further comprises:

inversely transforming the plurality of transformed coefficients to reconstruct a plurality of displacement coefficients.

9. A decoder comprising:

a processor; and a memory coupled to the processor, wherein the processor is configured to execute program instructions stored in the memory to perform:

decoding a syntax element associated with a coding mode from a bitstream associated with geometry displacements; and reconstructing, based on a coefficient configuration associated with the coding mode, a plurality of quantized transform coefficients from a plurality of zero-run length codes;

wherein the processor configured to perform the decoding the syntax element associated with the coding mode from the bitstream associated with geometry displacements is configured to perform:

decoding a syntax structure associated with a dynamic mesh sequence parameter set, comprising:

decoding a syntax element associated with a dmsps-mesh-LoD-count-minus-1 code to determine a number of levels of details equal to a value of the dmsps-mesh-LoD-count-minus-1 code plus one;

in response to determining that at least one syntax element associated with the coding mode is present, performing a respective one of a plurality of operation groups defined by a first iterative loop with a first variable from zero incremental to a maximum integer less than a sum of a value of the dmsps-mesh-LoD-count-minus-1 code plus one, comprising:

decoding a syntax element associated with a dmsps-mesh-LoD-coding-mode code indexed by the first variable to determine the coding mode.

10. An encoding method, comprising:

encoding a syntax element associated with a coding mode into a bitstream associated with geometry displacements; and converting, based on a coefficient configuration associated with the coding mode, a plurality of quantized transform coefficients to a plurality of zero-run length codes;

wherein the encoding the syntax element associated with the coding mode into the bitstream associated with geometry displacements comprises:

encoding a syntax structure associated with a dynamic mesh sequence parameter set, comprising:

encoding a syntax element associated with a dmsps-mesh-LoD-count-minus-1 code based on a value of a number of levels of details in a sequence minus one;

performing a respective one of a plurality of operation groups defined by a first iterative loop with a first variable from zero incremental to a maximum integer less than a sum of a value of the dmsps-mesh-LoD-count-minus-1 code plus one, comprising:

encoding a syntax element associated with a dmsps-mesh-LoD-coding-mode code indexed by the first variable based on the coding mode.

11. The method of claim 10, wherein the encoding the syntax element associated with the dmsps-mesh-LoD-coding-mode code indexed by the first variable based on the coding mode comprises:

in response to determining the first variable equal to zero, assigning the coding mode to a skip mode indicating no coded component of a single displacement coefficient;

in response to determining the first variable equal to one, assigning the coding mode to a simple mode indicating only a normal component of a single displacement coefficient; and in response to determining the first variable equal to two, assigning the coding mode to a full mode indicating normal, tangent, and bitangent components of a single displacement coefficient.

12. The method of claim 10, further comprising:

generating a plurality of entropy codes based on the plurality of zero-run length codes to encode the plurality of entropy codes into the bitstream associated with geometry displacements.

13. The method of claim 10, further comprises:

quantizing a plurality of transformed coefficients to generate the plurality of quantized transform coefficients.

* * * * *